US011709708B2

(12) United States Patent
Zhao et al.

(10) Patent No.: US 11,709,708 B2
(45) Date of Patent: *Jul. 25, 2023

(54) FUNCTION RESOURCE CONFIGURATION METHOD AND DEVICE

(71) Applicant: Huawei Technologies Co., Ltd., Shenzhen (CN)

(72) Inventors: Peng Zhao, Xi'an (CN); Siqi Hao, Helsinki (FI); Xiangyang Wang, Xi'an (CN); Feng Chen, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/393,573

(22) Filed: Aug. 4, 2021

(65) Prior Publication Data

US 2022/0004435 A1 Jan. 6, 2022

Related U.S. Application Data

(63) Continuation of application No. 16/336,010, filed as application No. PCT/CN2016/099756 on Sep. 22, 2016, now Pat. No. 11,099,896.

(51) Int. Cl.
*G06F 9/50* (2006.01)
*H04W 4/80* (2018.01)
(Continued)

(52) U.S. Cl.
CPC ............ *G06F 9/5011* (2013.01); *G06F 1/163* (2013.01); *H04W 4/80* (2018.02); *H04W 8/22* (2013.01)

(58) Field of Classification Search
CPC ...... G06F 1/163; G06F 1/1698; G06F 9/5011; G06F 9/505; G06F 9/5077; G06F 9/5094
See application file for complete search history.

(56) References Cited

U.S. PATENT DOCUMENTS

| 8,983,539 | B1 | 3/2015 | Kim et al. |
| 2002/0091843 | A1 | 7/2002 | Vaid |

(Continued)

FOREIGN PATENT DOCUMENTS

| CN | 104202410 A | 12/2014 |
| CN | 104640059 A | 5/2015 |

(Continued)

OTHER PUBLICATIONS

Levy, A., et al., "Beetle: Flexible Communication for Bluetooth Low Energy," Retrieved from the internet: https://dl.acm.doi/10.1145/2906388.2906414, MobiSys'16, Jun. 20, 2016, 12 pages.

*Primary Examiner* — Tuan C Dao
(74) *Attorney, Agent, or Firm* — Conley Rose, P.C.

(57) ABSTRACT

A function resource configuration method includes receiving, by a wearable device, a distribution request sent by a first terminal, where the distribution request is used to request the wearable device to distribute a first function resource of the wearable device to the first terminal, and where the first function resource is already occupied by a second terminal. The wearable device determines, based on the distribution request, whether to allow the first terminal to use the first function resource. If the wearable device allows the first terminal to use the first function resource, the wearable device sends a notification message to the first terminal that instructs the first terminal to use the first function resource.

20 Claims, 20 Drawing Sheets

(51) Int. Cl.
*G06F 1/16* (2006.01)
*H04W 8/22* (2009.01)

(56) References Cited

U.S. PATENT DOCUMENTS

| | | |
|---|---|---|
| 2008/0216171 A1 | 9/2008 | Sano et al. |
| 2010/0192107 A1 | 7/2010 | Takahashi |
| 2011/0158303 A1* | 6/2011 | Gauthier ............ H04W 52/0283 |
| | | 375/224 |
| 2012/0042075 A1* | 2/2012 | Goetz .................. G06F 9/5072 |
| | | 709/226 |
| 2012/0087078 A1 | 4/2012 | Medica et al. |
| 2013/0260686 A1* | 10/2013 | Mukherjee ............ G06F 9/5027 |
| | | 455/41.2 |
| 2014/0068027 A1 | 3/2014 | Flacco et al. |
| 2014/0179233 A1 | 6/2014 | Kang et al. |
| 2015/0071270 A1 | 3/2015 | Harel et al. |
| 2015/0149679 A1 | 5/2015 | Mostafa et al. |
| 2015/0189006 A1* | 7/2015 | Smus ................... H04L 67/104 |
| | | 709/204 |
| 2015/0302732 A1* | 10/2015 | Wright ............. H04N 21/42204 |
| | | 340/5.25 |
| 2015/0324616 A1* | 11/2015 | Alarabi ................... G06F 21/88 |
| | | 726/25 |
| 2016/0014550 A1 | 1/2016 | Chiddarwar et al. |
| 2016/0050114 A1 | 2/2016 | John Archibald et al. |
| 2016/0112340 A1* | 4/2016 | Zhong ................... H04L 67/568 |
| | | 709/226 |
| 2016/0150350 A1 | 5/2016 | Ingale et al. |
| 2016/0156575 A1* | 6/2016 | Jeong ...................... H04L 51/10 |
| | | 709/206 |
| 2016/0156723 A1 | 6/2016 | Seo et al. |
| 2016/0219424 A1 | 7/2016 | Xu |
| 2017/0032331 A1 | 2/2017 | Takano et al. |
| 2017/0124737 A1* | 5/2017 | Joseph .................... H04L 12/14 |
| 2017/0289329 A1 | 10/2017 | Yim et al. |
| 2017/0351813 A1 | 12/2017 | Su et al. |

FOREIGN PATENT DOCUMENTS

| | | |
|---|---|---|
| CN | 104661326 A | 5/2015 |
| CN | 105917323 A | 8/2016 |
| WO | 2016047902 A1 | 3/2016 |

* cited by examiner

FUNCTION RESOURCE CONFIGURATION METHOD AND DEVICE

CROSS-REFERENCE TO RELATED APPLICATIONS

This is a continuation of U.S. patent application Ser. No. 16/336,010 filed on Mar. 22, 2019, now U.S. Pat. No. 11,099,896, which is a U.S. National Stage of International Patent Application No. PCT/CN2016/099756 filed on Sep. 22, 2016. Both of the aforementioned applications are hereby incorporated by reference in their entireties.

TECHNICAL FIELD

This application relates to the field of communications technologies, and in particular, to a function resource configuration method and device.

BACKGROUND

With development of communications technologies, a wearable device (such as a Bluetooth wristband, a smartwatch, smart glasses) has increasingly rich functions, such as a Bluetooth earphone function and a sport and health function.

A wearable device having a plurality of functions includes a plurality of function resources. The wearable device may support a plurality of terminals to use different function resources in the wearable device. Specifically, if the wearable device distributes a function resource in the wearable device to a terminal, the terminal may use the function resource. For example, for a wearable device having the Bluetooth earphone function and the sport and health function, if the wearable device is successfully paired with a terminal, and the wearable device distributes a sport and health function resource to the terminal, the terminal may use the sport and health function resource.

However, during a period in which the terminal occupies the sport and health function resource, regardless of whether the terminal uses the sport and health function resource, another terminal cannot obtain the sport and health function resource.

SUMMARY

This application provides a function resource configuration method and device, so as to resolve a problem that during a period in which a terminal occupies a function resource in a wearable device, another terminal cannot obtain the function resource.

To achieve the foregoing objective, the following technical solutions are used in this application.

According to a first aspect, a function resource configuration method is provided. The method is performed by a wearable device including at least one function resource. For a first function resource in the at least one function resource, in a scenario in which the first function resource is already occupied by a second terminal, after the wearable device receives a distribution request that is sent by a first terminal and that is used to request the wearable device to distribute the first function resource to the first terminal, the wearable device determines, based on the distribution request received by the wearable device, whether to allow the first terminal to use the first function resource, and if the wearable device allows the first terminal to use the first function resource, the wearable device sends a notification message to the first terminal, to instruct the first terminal to use the first function resource.

In the function resource configuration method provided in this application, even if the first function resource is already occupied by the second terminal, after receiving the distribution request sent by the first terminal, the wearable device also determines, based on the distribution request received by the wearable device, whether to allow the first terminal to use the first function resource. If the wearable device allows the first terminal to use the first function resource, the wearable device sends the notification message to the first terminal, to instruct the first terminal to use the first function resource. In this way, in a scenario in which the first function resource is already occupied by the second terminal, the first terminal may also use the first function resource.

It is easily understood that in a scenario in which the first function resource is already occupied by the second terminal but the second terminal has not used the first function resource for a long time, by using the function resource configuration method provided in this application, the first terminal can successfully preempt and use the first function resource, thereby effectively improving utilization of the first function resource.

In this application, that the first function resource is already occupied by the second terminal means that the wearable device already distributes the first function resource to the second terminal, that is, the second terminal already obtains the first function resource. It should be noted that after obtaining the first function resource, the second terminal may use the first function resource. However, during a period in which the second terminal occupies the first function resource, the second terminal may not use the first function resource.

Optionally, in a possible implementation of this application, after the wearable device receives the distribution request sent by the first terminal, the wearable device presents content corresponding to the distribution request to a user, and receives an instruction entered by the user. Specifically, a method for determining, by the wearable device based on the distribution request, whether to allow the first terminal to use the first function resource includes: if the wearable device receives a first instruction entered by the user, allowing, by the wearable device, the first terminal to use the first function resource, where the first instruction is used to instruct to distribute the first function resource to the first terminal; or if the wearable device receives a second instruction entered by the user, forbidding, by the wearable device, the first terminal to use the first function resource, where the second instruction is used to indicate that distribution of the first function resource to the first terminal is forbidden.

By using the method in which the wearable device displays the content corresponding to the distribution request and determines, based on the instruction entered by the user, whether to allow the first terminal to use the first function resource, interaction between the wearable device and the user is implemented, thereby improving user experience.

Optionally, in another possible implementation of this application, a method for determining, by the wearable device based on the distribution request, whether to allow the first terminal to use the first function resource includes: determining, by the wearable device based on the distribution request, whether occupation duration is greater than a preset threshold, where the occupation duration is a time in which the second terminal occupies the first function resource; and if the occupation duration is greater than or equal to the preset threshold, allowing, by the wearable device, the first terminal to occupy the first function resource; or if the occupation duration is less than the preset threshold, forbidding, by the wearable device, the first terminal to occupy the first function resource.

The method in which the wearable device determines, based on the occupation duration, whether to allow the first terminal to use the first function resource ensures that each terminal can effectively use the first function resource after occupying the first function resource.

Optionally, in another possible implementation of this application, a method for determining, by the wearable device based on the distribution request, whether to allow the first terminal to use the first function resource includes: determining, by the wearable device based on the distribution request, whether a priority of the first terminal is higher than a priority of the second terminal; and if the priority of the first terminal is higher than the priority of the second terminal, allowing, by the wearable device, the first terminal to use the first function resource; or if the priority of the first terminal is lower than the priority of the second terminal, forbidding, by the wearable device, the first terminal to use the first function resource.

The method in which the wearable device determines, based on the priority of the first terminal and the priority of the second terminal, whether to allow the first terminal to use the first function resource ensures that a terminal having a higher priority preferentially uses the first function resource.

It can be learned that according to any of the foregoing methods, the wearable device can determine whether to allow the first terminal to use the first function resource, and each method has a corresponding effect. It should be noted that in this application, the method for determining, by the wearable device, whether to allow the first terminal to use the first function resource may alternatively be a method other than the foregoing methods. This is not specifically limited in this application.

Optionally, in another possible implementation of this application, before the wearable device receives the distribution request sent by the first terminal, the wearable device determines that the first function resource is already occupied by the second terminal. Specifically, a method for determining, by the wearable device, that the first function resource is already occupied by the second terminal includes: first, receiving, by the wearable device, a state query request sent by the first terminal, where the state query request is used to request to query a state of the first function resource; and then determining, by the wearable device based on the state query request, that the first function resource is already occupied by the second terminal.

The state of the first function resource in the wearable device may be that the first function resource is already occupied by the first terminal, is not occupied by any terminal, or is already occupied by the second terminal. The wearable device may determine a specific state of the first function resource based on the state query request sent by the first terminal.

Optionally, in another possible implementation of this application, after the determining, by the wearable device, that the first function resource is already occupied by the second terminal, the wearable device sends a state query response carrying a first state identifier to the first terminal, where the first state identifier is used to indicate that the first function resource is already occupied by the second terminal.

Optionally, in another possible implementation of this application, after the receiving, by the wearable device, a state query request sent by the first terminal, the wearable device determines, based on the state query request, that the first function resource is not occupied by any terminal, and sends a state query response carrying a second state identifier to the first terminal, where the second state identifier is used to indicate that the first function resource is not occupied by any terminal.

Optionally, in another possible implementation of this application, after the receiving, by the wearable device, a state query request sent by the first terminal, the wearable device determines, based on the state query request, that the first function resource is already occupied by the first terminal, and sends a state query response carrying a third state identifier to the first terminal, where the third state identifier is used to indicate that the first function resource is already occupied by the first terminal.

Regardless of which state the first function resource is specifically in, after the wearable device determines, based on the state query request, the state of the first function resource, the wearable device sends a state query response carrying a state identifier corresponding to the state of the first function resource to the first terminal. In this way, the first terminal may learn about the state of the first function resource based on the state identifier, so that the first terminal determines, based on the state of the first function resource, whether the first function resource can be directly used.

Optionally, in another possible implementation of this application, after the wearable device receives the distribution request sent by the first terminal, and before the determining, by the wearable device based on the distribution request, whether to allow the first terminal to use the first function resource, the wearable device may further determine, based on the distribution request, that the first function resource is already occupied by the second terminal.

In this application scenario, the wearable device may directly determine, based on the distribution request, that the first function resource is already occupied by the second terminal device, and determine, based on the distribution request, whether to allow the first terminal to use the first function resource. Compared with the foregoing application scenario in which the wearable device determines, based on the state query request, that the first function resource is already occupied by the second terminal device, in this application scenario, information exchange between the wearable device and the first terminal is reduced, thereby reducing a waste of resources.

Optionally, in another possible implementation of this application, after the wearable device receives the distribution request sent by the first terminal, the wearable device may further determine, based on the distribution request, that the first function resource is not occupied by any terminal, and determine, based on the distribution request, whether to allow the first terminal to use the first function resource, and if the wearable device allows the first terminal to use the first function resource, the wearable device sends a notification message to the first terminal.

Optionally, in another possible implementation of this application, after the wearable device receives the distribution request sent by the first terminal, the wearable device may further determine, based on the distribution request, that the first function resource is already occupied by the first terminal, and send the notification to the first terminal, to instruct the first terminal to use the first function resource.

It can be learned that the wearable device may directly determine the state of the first function resource based on the distribution request, and when allowing the first terminal to use the first function resource, the wearable device sends the notification message to the first terminal. In this way, regardless of which state the first function resource is specifically in, provided that the wearable device allows the first terminal to use the first function resource, the first terminal may receive the notification message sent by the wearable device, so as to use the first function resource.

Specifically, the state query request sent by the first terminal to the wearable device carries an identifier of the first terminal and an identifier of the first function resource. In a scenario in which the first terminal sends the state query request to the wearable device first, and then sends the distribution request to the wearable device, the distribution request carries the identifier of the first function resource, and may further carry the identifier of the first terminal. In a scenario in which the first terminal sends no state query request to the wearable device, the distribution request sent by the first terminal carries the identifier of the first function resource and the identifier of the first terminal.

Optionally, in another possible implementation of this application, before the wearable device determines the state of the first function resource, the wearable device further needs to determine whether the wearable device includes the first function resource.

Optionally, in another possible implementation of this application, a method for determining, by the wearable device, whether the wearable device includes the first function resource includes: detecting, by the wearable device, whether a function resource list includes the identifier of the first function resource, where the function resource list stores an identifier of a function resource included in the wearable device; and if the function resource list stores the identifier of the first function resource, determining, by the wearable device, that the wearable device includes the first function resource; or if the function resource list does not store the identifier of the first function resource, determining, by the wearable device, that the wearable device does not include the first function resource.

The function resource list in this application may be indicated by using a table, or may be indicated in another form. This is not specifically limited in this application.

It is easily understood that in this application, after being successfully paired with the wearable device, the first terminal may communicate with the wearable device first, to obtain the identifier of the function resource included in the wearable device. In this scenario, after receiving the request sent by the first terminal, the wearable device does not need to detect whether the wearable device includes the first function resource. In addition, in this application, after being successfully paired with the wearable device, the first terminal may further directly send a request carrying the identifier of the first function resource to the wearable device. In this scenario, the wearable device may not include the first function resource. Therefore, after receiving the request, the wearable device needs to detect whether the wearable device includes the first function resource.

Optionally, in another possible implementation of this application, the wearable device determines the state of the first function resource based on the identifier of the first function resource. Specifically, a method for determining, by the wearable device, the state of the first function resource based on the identifier of the first function resource includes: detecting, by the wearable device, whether a function resource occupation list includes the identifier of the first function resource, where the function resource occupation list stores a correspondence between an identifier of a function resource that is already occupied and an identifier of a terminal that occupies the function resource; if the function resource occupation list includes the identifier of the first function resource, detecting, by the wearable device, whether an identifier of a terminal corresponding to the identifier of the first function resource in the function resource occupation list is the same as the identifier of the first terminal; if yes, determining that the state of the first function resource is that the first function resource is already occupied by the first terminal; or if no, determining that the state of the first function resource is that the first function resource is already occupied by another terminal; and if the function resource occupation list does not include the identifier of the first function resource, determining that the state of the first function resource is that the first function resource is not occupied by any terminal.

The function resource occupation list in this application may be indicated by using a table, or may be indicated in another form. This is not specifically limited in this application.

According to a second aspect, a function resource configuration method is provided. The method is performed by a first terminal that communicates with a wearable device, and the wearable device includes at least one function resource. For a first function resource in the at least one function resource, after the first terminal determines that the first function resource is already occupied by a second terminal, the first terminal sends a distribution request to the wearable device to request the wearable device to distribute the first function resource to the first terminal. Correspondingly, the first terminal may receive a notification message sent by the wearable device, where the notification message is used to instruct the first terminal to use the first function resource.

In the function resource configuration method provided in this application, even if the first terminal determines that the first function resource is already occupied by the second terminal, the first terminal may still send a function resource distribution request to the wearable device to request the wearable device to distribute the first function resource to the first terminal. In this way, the wearable device may determine, based on the function resource distribution request, whether to allow the first terminal to occupy the first function resource. If the wearable device determines that the first terminal is allowed to use the first function resource, the first terminal receives the notification message sent by the wearable device. In this way, in a scenario in which the first function resource is already occupied by the second terminal, the first terminal may also use the first function resource based on the notification message.

It is easily understood that in a scenario in which the first function resource is already occupied by the second terminal but the second terminal has not used the first function resource for a long time, by using the function resource configuration method provided in this application, the first terminal can successfully preempt and use the first function resource, thereby effectively improving utilization of the first function resource.

Optionally, in a possible implementation of this application, before determining that the first function resource in the wearable device is already occupied by the second terminal, the first terminal sends a state query request to the wearable device, where the state query request is used to request to obtain a state of the first function resource.

In this application, the first terminal determines, by requesting to obtain the state of the first function resource from the wearable device, whether the first function resource can be directly used.

Optionally, in another possible implementation of this application, a method for determining, by the first terminal, that the first function resource in the wearable device is already occupied by the second terminal includes: receiving, by the first terminal, a state query response that carries a first state identifier and that is sent by the wearable device, where the first state identifier is used to indicate that the first function resource is already occupied by the second terminal; and determining, by the first terminal based on the first state identifier, that the first function resource is already occupied by the second terminal.

Optionally, in another possible implementation of this application, after the first terminal determines that the first function resource in the wearable device is already occupied by the second terminal, the configuration method further includes: presenting, by the first terminal, content corresponding to the state query response to a user; and receiving, by the first terminal, a third instruction entered by the user, where the third instruction is used to instruct to request the wearable device to distribute the first function resource to the first terminal.

In this application, the first terminal implements interaction with the user by presenting the content corresponding to the state query response to the user, to help the user determine, based on an actual requirement of the user, whether the first terminal needs to use the first function resource, thereby resolving a problem that the user cannot learn that the terminal cannot use a function corresponding to the first function resource, and improving user experience to some extent. In addition, this implementation relatively better conforms with an actual application.

Optionally, in another possible implementation of this application, after the sending, by the first terminal, a state query request to the wearable device, the first terminal receives a state query response that carries a second state identifier and that is sent by the wearable device, where the second state identifier is used to indicate that the first function resource is not occupied by any terminal.

Optionally, in another possible implementation of this application, after the sending, by the first terminal, a state query request to the wearable device, the first terminal receives a state query response that carries a third state identifier and that is sent by the wearable device, where the third state identifier is used to indicate that the first function resource is already occupied by the first terminal; and the first terminal uses the first function resource based on the third state identifier.

The first function resource may be in a state in which the first function resource is already occupied by the first terminal, is already occupied by the second terminal, or is not occupied by any terminal. When the first terminal requests to obtain the state of the first function resource from the wearable device, regardless of which state the first function resource is specifically in, the wearable device sends a state query response carrying a state identifier corresponding to the state of the first function resource to the first terminal. In this way, the first terminal may learn about the state of the first function resource based on the state identifier, so that the first terminal determines, based on the state of the first function resource, whether the first function resource can be directly used.

According to a third aspect, a wearable device is provided. The wearable device includes a receiving unit, a determining unit, and a sending unit.

Functions implemented by the unit modules provided in this application are specifically as follows:

The receiving unit is configured to receive a distribution request sent by a first terminal, where the distribution request is used to request the wearable device to distribute a first function resource of the wearable device to the first terminal, and the first function resource is already occupied by a second terminal; the determining unit is configured to determine, based on the distribution request received by the receiving unit, whether to allow the first terminal to use the first function resource; and the sending unit is configured to: if the determining unit allows the first terminal to use the first function resource, send a notification message to the first terminal, to instruct the first terminal to use the first function resource.

Further, in a possible implementation of this application, the wearable device further includes a display unit, where the display unit is configured to: after the receiving unit receives the distribution request sent by the first terminal, present content corresponding to the distribution request to a user; the receiving unit is further configured to: after the display unit presents the content corresponding to the distribution request to the user, receive an instruction entered by the user; and the determining unit is specifically configured to: if the receiving unit receives a first instruction entered by the user, allow the first terminal to use the first function resource, where the first instruction is used to instruct to distribute the first function resource to the first terminal, and is specifically configured to: if the receiving unit receives a second instruction entered by the user, forbid the first terminal to use the first function resource, where the second instruction is used to indicate that distribution of the first function resource to the first terminal is forbidden.

Further, in another possible implementation of this application, the wearable device further includes a judgment unit, where the judgment unit is configured to determine, based on the distribution request received by the receiving unit, whether occupation duration is greater than a preset threshold, where the occupation duration is a time in which the second terminal occupies the first function resource; and the determining unit is specifically configured to: if the judgment unit determines that the occupation duration is greater than or equal to the preset threshold, allow the first terminal to use the first function resource, and is specifically configured to: if the judgment unit determines that the occupation duration is less than the preset threshold, forbid the first terminal to use the first function resource.

Further, in another possible implementation of this application, the wearable device further includes a judgment unit, where the judgment unit is configured to determine, based on the distribution request received by the receiving unit, whether a priority of the first terminal is higher than a priority of the second terminal; and the determining unit is specifically configured to: if the judgment unit determines that the priority of the first terminal is higher than the priority of the second terminal, allow the first terminal to use the first function resource, and is specifically configured to: if the judgment unit determines that the priority of the first terminal is lower than the priority of the second terminal, forbid the first terminal to use the first function resource.

Further, in another possible implementation of this application, the receiving unit is further configured to: before receiving the distribution request sent by the first terminal, receive a state query request sent by the first terminal, where the state query request is used to request to query a state of the first function resource; and the determining unit is further configured to determine, based on the state query request received by the receiving unit, that the first function resource is already occupied by the second terminal.

Further, in another possible implementation of this application, the sending unit is further configured to: after the determining unit determines that the first function resource is already occupied by the second terminal, send a state query response carrying a first state identifier to the first terminal, where the first state identifier is used to indicate that the first function resource is already occupied by the second terminal.

Further, in another possible implementation of this application, the determining unit is further configured to: after the receiving unit receives the state query request sent by the first terminal, determine, based on the state query request, that the first function resource is not occupied by any terminal; and the sending unit is further configured to: send a state query response carrying a third state identifier to the first terminal, where the second state identifier is used to indicate that the first function resource is not occupied by any terminal.

Further, in another possible implementation of this application, the determining unit is further configured to: after the receiving unit receives the state query request sent by the first terminal, determine, based on the state query request, that the first function resource is already occupied by the first terminal; and the sending unit is further configured to: send a state query response carrying a third state identifier to the first terminal, where the third state identifier is used to indicate that the first function resource is already occupied by the first terminal.

Further, in another possible implementation of this application, the determining unit is further configured to: after the receiving unit receives the distribution request sent by the first terminal, and before determining, based on the distribution request, whether to allow the first terminal to use the first function resource, determine, based on the distribution request, that the first function resource is already occupied by the second terminal.

According to a fourth aspect, a wearable device is provided. The wearable device includes a processor, a memory, and a communications interface. The processor is configured to: receive, by using the communications interface, a distribution request sent by a first terminal, where the distribution request is used to request the wearable device to distribute a first function resource stored in the memory to the first terminal, and the first function resource is already occupied by a second terminal; determine, based on the distribution request, whether to allow the first terminal to use the first function resource; and if the first terminal is allowed to use the first function resource, send a notification message to the first terminal by using the communications interface, to instruct the first terminal to use the first function resource.

Further, in a possible implementation of this application, the wearable device further includes a display screen, where the display screen is configured to: after the processor receives, by using the communications interface, the distribution request sent by the first terminal, present content corresponding to the distribution request to a user, and receive an instruction entered by the user; and the processor is specifically configured to: if the display screen receives a first instruction entered by the user, allow the first terminal to use the first function resource, where the first instruction is used to instruct to distribute the first function resource to the first terminal, and is specifically configured to: if the display screen receives a second instruction entered by the user, forbid the first terminal to use the first function resource, where the second instruction is used to indicate that distribution of the first function resource to the first terminal is forbidden.

Further, in another possible implementation of this application, the processor is specifically configured to: determine, based on the distribution request, whether occupation duration is greater than a preset threshold, where the occupation duration is a time in which the second terminal occupies the first function resource; and if the occupation duration is greater than or equal to the preset threshold, allow the first terminal to use the first function resource; or if the occupation duration is less than the preset threshold, forbid the first terminal to use the first function resource.

Further, in another possible implementation of this application, the processor is specifically configured to: determine, based on the distribution request, whether a priority of the first terminal is higher than a priority of the second terminal; and if the priority of the first terminal is higher than the priority of the second terminal, allow the first terminal to use the first function resource; or if the priority of the first terminal is lower than the priority of the second terminal, forbid the first terminal to use the first function resource.

Further, in another possible implementation of this application, before receiving, by using the communications interface, the distribution request sent by the first terminal, the processor is further configured to: receive, by using the communications interface, a state query request sent by the first terminal, where the state query request is used to request to query a state of the first function resource; and determine, based on the state query request, that the first function resource is already occupied by the second terminal.

Further, in another possible implementation of this application, after determining that the first function resource is already occupied by the second terminal, the processor is further configured to: send, by using the communications interface, a state query response carrying a first state identifier to the first terminal, where the first state identifier is used to indicate that the first function resource is already occupied by the second terminal.

Further, in another possible implementation of this application, after receiving, by using the communications interface, the state query request sent by the first terminal, the processor is further configured to: determine, based on the state query request, that the first function resource is not occupied by any terminal; and send, by using the communications interface, a state query response carrying a second state identifier to the first terminal, where the second state identifier is used to indicate that the first function resource is not occupied by any terminal.

Further, in another possible implementation of this application, after receiving, by using the communications interface, the state query request sent by the first terminal, the processor is further configured to: determine, based on the state query request, that the first function resource is already occupied by the first terminal; and send, by using the communications interface, a state query response carrying a third state identifier to the first terminal, where the third state identifier is used to indicate that the first function resource is already occupied by the first terminal.

Further, in another possible implementation of this application, the processor is further configured to: after receiving, by using the communications interface, the distribution request sent by the first terminal, and before determining, based on the distribution request, whether to allow the first terminal to use the first function resource, determine, based on the distribution request, that the first function resource is already occupied by the second terminal.

According to a fifth aspect, a computer-readable storage medium is further provided. The computer-readable storage medium includes one or more pieces of program code, and when a processor of a wearable device executes the program code, the wearable device performs the function resource configuration method according to the first aspect and various possible implementations thereof.

In this application, a name of the wearable device does not limit devices or functional modules. In actual implementation, the devices or the functional modules may be named after another name. Provided that functions of the devices or the functional modules are similar to those in this application, the devices or the functional modules belong to the scope of the claims of this application and their equivalent technologies.

For specific descriptions of the third aspect, the fourth aspect, the fifth aspect, and various implementations thereof in this application, refer to detailed descriptions in the first aspect and the various implementations thereof; and for beneficial effects of the third aspect, the fourth aspect, the fifth aspect, and the various implementations thereof, refer to beneficial effect analysis in the first aspect and the various implementations thereof, and details are not described herein again.

According to a sixth aspect, a terminal is provided. The terminal includes a determining unit, a sending unit, and a receiving unit.

Functions implemented by the unit modules provided in this application are specifically as follows:

The determining unit is configured to determine that a first function resource in a wearable device is already occupied by a second terminal; the sending unit is configured to send a distribution request to the wearable device, where the distribution request is used to request the wearable device to distribute the first function resource to the first terminal; and the receiving unit is configured to receive a notification message sent by the wearable device, where the notification message is used to instruct the first terminal to use the first function resource.

Further, in a possible implementation of this application, the sending unit is further configured to: before the determining unit determines that the first function resource in the wearable device is already occupied by the second terminal, send a state query request to the wearable device, where the state query request is used to request to obtain a state of the first function resource.

Further, in another possible implementation of this application, the receiving unit is further configured to receive a state query response that carries a first state identifier and that is sent by the wearable device, where the first state identifier is used to indicate that the first function resource is already occupied by the second terminal; and the determining unit is specifically configured to determine, based on the first state identifier in the state query response that is received by the receiving unit, that the first function resource is already occupied by the second terminal.

Further, in another possible implementation of this application, the terminal further includes a display unit, where the display unit is configured to: after the determining unit determines that the first function resource in the wearable device is already occupied by the second terminal, present content corresponding to the state query response to a user; and the receiving unit is further configured to receive a third instruction entered by the user, where the third instruction is used to instruct to request the wearable device to distribute the first function resource to the first terminal.

Further, in another possible implementation of this application, the receiving unit is further configured to: after the sending unit sends the state query request to the wearable device, receive a state query response that carries a second state identifier and that is sent by the wearable device, where the second state identifier is used to indicate that the first function resource is not occupied by any terminal.

Further, in another possible implementation of this application, the receiving unit is further configured to: after the sending unit sends the state query request to the wearable device, receive a state query response that carries a third state identifier and that is sent by the wearable device, where the third state identifier is used to indicate that the first function resource is already occupied by the first terminal; and the terminal further includes a function implementation unit, where the function implementation unit is configured to use the first function resource based on the third state identifier carried in the state query response received by the receiving unit.

According to a seventh aspect, a terminal is provided. The terminal includes a processor and a communications interface. Specifically, the processor is configured to: determine that a first function resource in a wearable device is already occupied by another terminal; send a distribution request to the wearable device by using the communications interface, where the distribution request is used to request the wearable device to distribute the first function resource to the terminal; and receive, by using the communications interface, a notification message sent by the wearable device, where the notification message is used to instruct the first terminal to use the first function resource.

Further, in a possible implementation of this application, the processor is further configured to: before determining that the first function resource in the wearable device is already occupied by the another terminal, send a state query request to the wearable device by using the communications interface, where the state query request is used to request to obtain a state of the first function resource.

Further, in another possible implementation of this application, the processor is specifically configured to: receive, by using the communications interface, a state query response that carries a first state identifier and that is sent by the wearable device, where the first state identifier is used to indicate that the first function resource is already occupied by the another terminal; and determine, based on the first state identifier, that the first function resource is already occupied by the another terminal.

Further, in another possible implementation of this application, the terminal further includes a display screen, where the display screen is configured to: after the processor determines that the first function resource in the wearable device is already occupied by a second terminal, present content corresponding to the state query response to a user; and receive a third instruction entered by the user, where the third instruction is used to instruct to request the wearable device to distribute the first function resource to the terminal.

Further, in another possible implementation of this application, the processor is further configured to: after sending the state query request to the wearable device by using the communications interface, receive, by using the communications interface, a state query response that carries a second state identifier and that is sent by the wearable device, where the second state identifier is used to indicate that the first function resource is not occupied by any terminal.

Further, in another possible implementation of this application, the processor is further configured to: after sending the state query request to the wearable device by using the communications interface, receive, by using the communications interface, a state query response that carries a third state identifier and that is sent by the wearable device, where the third state identifier is used to indicate that the first function resource is already occupied by the terminal; and use the first function resource based on the third state identifier.

According to an eighth aspect, a computer-readable storage medium is further provided. The computer-readable storage medium includes one or more pieces of program code, and when a processor of a terminal executes the program code, the terminal performs the function resource configuration method according to the second aspect and various possible implementations thereof.

In this application, a name of the terminal does not limit devices or functional modules. In actual implementation, the devices or the functional modules may be named after another name. Provided that functions of the devices or the functional modules are similar to those in this application, the devices or the functional modules belong to the scope of the claims of this application and their equivalent technologies.

For specific descriptions of the sixth aspect, the seventh aspect, the eighth aspect, and various implementations thereof in this application, refer to detailed descriptions in the second aspect and the various implementations thereof; and for beneficial effects of the sixth aspect, the seventh aspect, the eighth aspect, and the various implementations thereof, refer to beneficial effect analysis in the second aspect and the various implementations thereof, and details are not described herein again.

Optionally, in the foregoing aspects and various implementations of each aspect, the first function resource in this application is a resource with a user attribute or a resource without a user attribute. A resource with a user attribute may be construed as a function resource that needs to obtain and/or store related data corresponding to a user during running. For example, during running, a function resource used to implement a function of detecting blood pressure of a user needs to obtain and/or store data indicating the blood pressure of the user. Correspondingly, a resource without a user attribute may be construed as a function resource that does not need to obtain and/or store related data corresponding to a user during running, for example, a Bluetooth earphone function resource and a music play function resource. The Bluetooth earphone function resource is only used to implement a call function of a user, and does not need to store related data. The music play function resource is only used to implement a function of playing music for a terminal, and does not need to store related data of a user.

Optionally, in the foregoing aspects and the various implementations of each aspect, the state query request sent by the first terminal to the wearable device carries the identifier of the first terminal and the identifier of the first function resource. In a scenario in which the first terminal sends the state query request to the wearable device first, and then sends the distribution request to the wearable device, the distribution request carries the identifier of the first function resource, and may further carry the identifier of the first terminal. In a scenario in which the first terminal sends no state query request to the wearable device, the distribution request sent by the first terminal carries the identifier of the first function resource and the identifier of the first terminal.

It is clearer and easier to understand these aspects or other aspects of this application in the following descriptions.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of this application.

DESCRIPTION OF EMBODIMENTS

Figure 1:
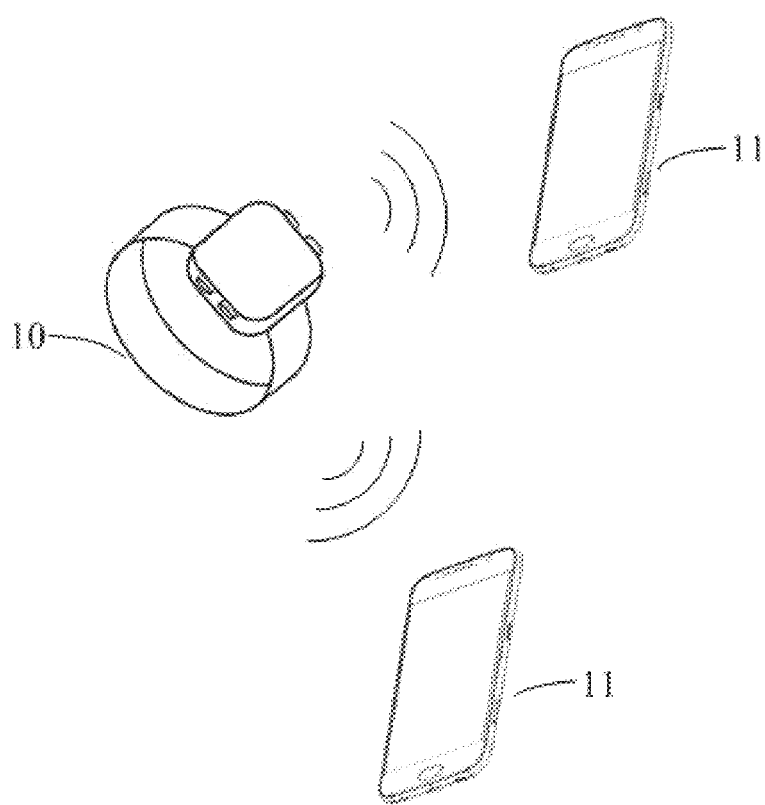
FIG. 1 is a schematic structural diagram of a communications system according to an embodiment of this application.

The following describes in detail the technical solutions in the embodiments of this application with reference to the accompanying drawings in the embodiments of this application. Apparently, the described embodiments are merely some but not all of the embodiments of this application.

In the specification, claims, and accompanying drawings of this application, the terms "first", "second", and so on are intended to distinguish between different objects but do not limit a particular order. In addition, the terms "including", "comprising", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

In the following description, to illustrate rather than limit, specific details such as a particular system structure, an interface, and a technology are provided to make a thorough understanding of this application. However, a person skilled in the art should know that this application may be implemented in other embodiments without these specific details. In other cases, detailed descriptions of well-known mobile devices, circuits, and methods are omitted, so that this application is described without being obscured by unnecessary details.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A function resource in a wearable device may be understood as a service (English: service) of the wearable device, for example, detecting a heart rate of a user. Each function resource in the wearable device may have an identifier that can uniquely indicate the function resource.

Optionally, the identifier of the function resource may be a UUID (Universally Unique Identifier, universal unique identifier), or may be another identifier that can uniquely indicate the function resource. This is not specifically limited in this embodiment of this application.

In the prior art, when a wearable device including a plurality of function resources communicates with a terminal, if a terminal A already occupies a function resource a of the wearable device, a terminal B may fail to detect that the wearable device includes the function resource a; and consequently, the terminal B cannot use the function resource a of the wearable device. Alternatively, the terminal B may detect that the wearable device includes the function resource a; however, after the terminal B requests the wearable device to distribute the function resource a to the terminal B, the terminal B can receive only a response message that is sent by the wearable device and that is used to notify the terminal B that the function resource a cannot be used; and consequently, the terminal B still cannot use the function resource a of the wearable device. Because the terminal B cannot use the function resource a of the wearable device, the terminal B cannot implement a function corresponding to the function resource a. For a user to whom the terminal B belongs, the user does not know why the function cannot be used. Consequently, user experience is reduced to some extent.

For the prior-art problem that during a period in which the terminal A occupies the function resource a of the wearable device, the terminal B cannot obtain the function resource a, an embodiment of this application provides a function resource configuration method. When determining that a first function resource is already occupied by a second terminal and a first terminal is allowed to use the first function resource, a wearable device sends a notification message used to instruct the first terminal to use the first function resource to the first terminal, so that the first terminal uses the first function resource based on the notification message, thereby implementing a corresponding function.

The function resource configuration method provided in this embodiment of this application is applied to a communications system. FIG. 1 is a schematic structural diagram of a communications system according to an embodiment of this application. Referring to FIG. 1, the communications system includes a wearable device 10 and at least two terminals 11, and each terminal 11 is wirelessly connected to the wearable device 10.

A connection manner between each terminal 11 and the wearable device 10 may be any one of wireless short-range communications technologies such as BT (Bluetooth, Bluetooth), Wi-Fi (Wireless-Fidelity, Wireless Fidelity), NFC (Near Field Communication, near field communication), and infrared (English: Infrared). This is not specifically limited in this embodiment of this application.

The wearable device 10 includes but is not limited to various smart wearable devices such as a smartwatch, a smartband, a smart wrist strap, smart glasses, a smart necklace, a smart ring, smart earrings, and a smartphone. In an actual application, the wearable device 10 may provide various available network connection capabilities such as BT, Wi-Fi, NFC, and infrared. Various sensors such as an accelerometer, a gyroscope, a magnetometer, a light sensor, a GPS (Global Positioning System, Global Positioning System) and I/O (Input/Output, input/output) components such as a microphone and a speaker may be built in the wearable device 10. The wearable device 10 may effectively detect a movement (such as running or walking) of a user, sign data (such as a heart rate or blood pressure) of the user, and a place at which the user is currently located (that is, a location at which the user is currently located), and the like by using the foregoing various sensors.

The wearable device 10 includes a plurality of functions such as the foregoing functions of detecting walking of the user and detecting the heart rate of the user. Correspondingly, the wearable device 10 includes a plurality of function resources.

The terminal 11 is a wireless terminal that can provide various available network connection capabilities such as BT, Wi-Fi, NFC, and infrared. The wireless terminal may be a device that provides a user with voice and/or data connectivity, a handheld device with a wireless connection function, or another processing device connected to a wireless modem. The wireless terminal may communicate with one or more core networks by using a radio access network (such as RAN, Radio Access Network). The wireless terminal may be a mobile terminal such as a mobile phone (also referred to as a "cellular" phone) or a computer including a mobile terminal, or may be a portable, pocket-sized, handheld, computer built-in, or in-vehicle mobile apparatus. The wireless terminal exchanges voice and/or data with the radio access network. For example, the wireless terminal may be a device such as a PCS (Personal Communication Service, personal communication service) phone, a cordless telephone set, a Session Initiation Protocol (SIP) phone, a WLL (Wireless Local Loop, wireless local loop) station, or a PDA (Personal Digital Assistant, personal digital assistant). The wireless terminal may also be referred to as a user agent (User Agent), a user device (User Device), or UE (User Equipment, user equipment).

After the terminal 11 establishes a connection to the wearable device 10, the terminal 11 may use a function resource in the wearable device 10, thereby implementing a corresponding function.

It should be noted that, that the terminal 11 uses a function resource in the wearable device 10 is essentially that client software of the terminal 11 uses the function resource. For ease of description, that the terminal uses the function resource is uniformly described in this embodiment of this application.

Figure 2:
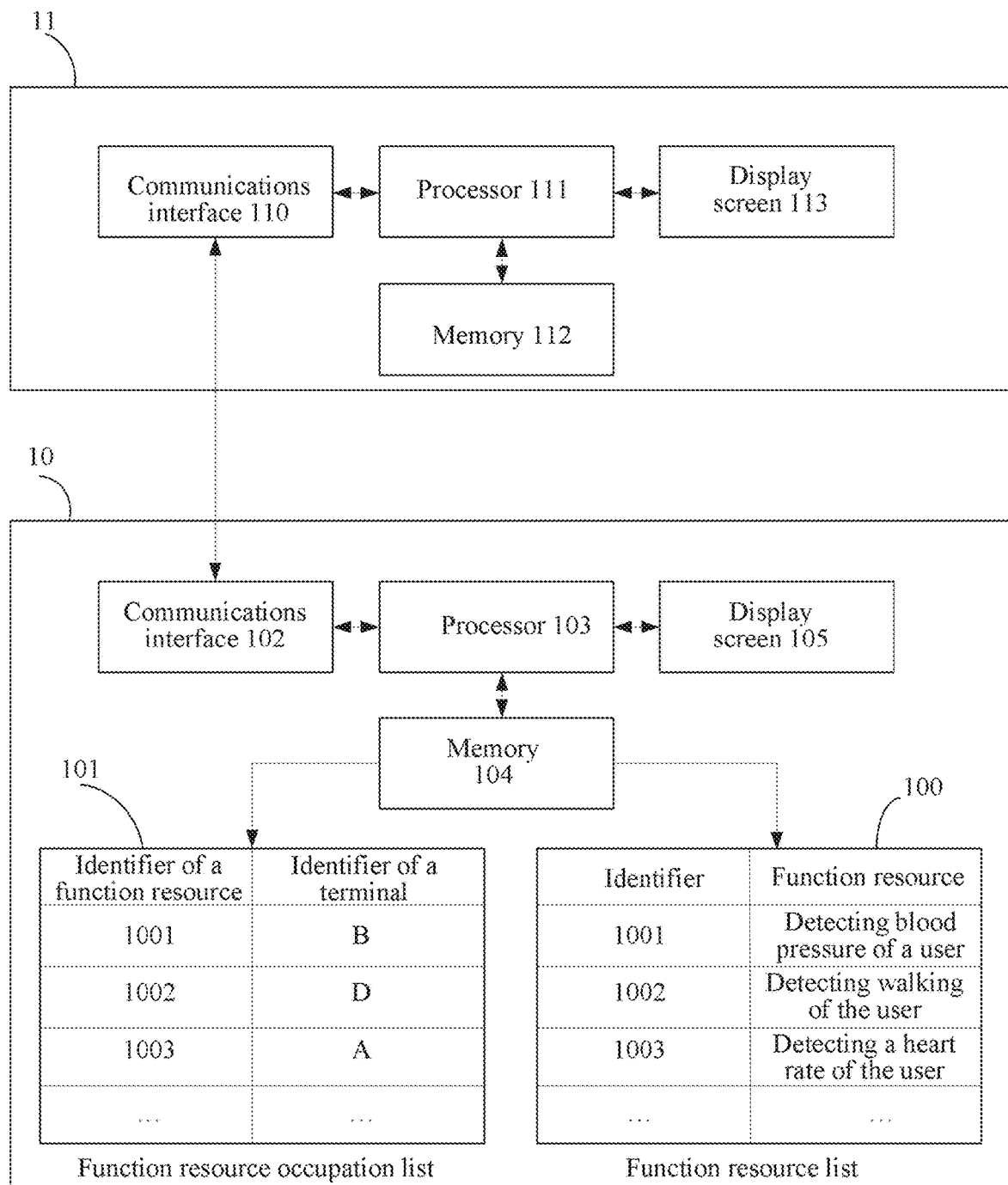
FIG. 2 is a schematic diagram of interactive collaboration between devices in a communications system according to an embodiment of this application.

With reference to FIG. 1, FIG. 2 is a schematic diagram of interactive collaboration between the wearable device 10 and the terminal 11 in the communications system. Processes of communication between the terminals 11 and the wearable device 10 in the communications system are the same. For brevity, FIG. 2 shows only the communication between one of the terminals 11 and the wearable device 10.

Referring to FIG. 2, the wearable device 10 in the communications system includes a function resource list 100. The function resource list 100 stores identifiers of all function resources included in the wearable device 10. Further, the function resource list 100 further stores all the function resources included in the wearable device 10, and each function resource uniquely corresponds to an identifier of a function resource.

The function resource list 100 may be stored in the wearable device 10 in a form of a table.

For example, if the function resources in the wearable device 10 include detecting blood pressure of a user, detecting walking of the user, detecting a heart rate of the user, and other function resources, where an identifier of the function resource for detecting the blood pressure of the user is 1001, an identifier of the function resource for detecting walking of the user is 1002, an identifier of the function resource for detecting the heart rate of the user is 1003, and each of the other function resources uniquely corresponds to an identifier of the function resource, a format of the function resource list 100 in the wearable device 10 may be an example of Table 100 in FIG. 2.

Optionally, the wearable device 10 may further include a function resource occupation list 101. The function resource occupation list 101 stores a correspondence between an identifier of a function resource that is already occupied and an identifier of a terminal that occupies the function resource.

For example, with reference to Table 1, if a terminal A occupies the function resource for detecting the heart rate of the user, a terminal B occupies the function resource for detecting the blood pressure of the user, and a terminal D occupies the function resource for detecting walking of the user, the function resource occupation list may be shown in Table 101 in FIG. 2.

Optionally, Table 100 and Table 101 may store all the function resources and function resource occupation information in a form of a table.

It should be noted that Table 100 and Table 101 show only examples of storage forms of the function resource identifier, a function resource identifier occupation status, and the like in the wearable device 10 in table forms, and are not intended to limit a storage form of the correspondence between the identifier of the function resource that is already occupied and the identifier of the terminal that occupies the function resource in the wearable device 10. Certainly, the storage form of the correspondence between the identifier of the function resource that is already occupied and the identifier of the terminal that occupies the function resource in the wearable device 10 may alternatively be another storage form. This is not limited in this embodiment of this application.

The wearable device 10 may determine, based on the function resource occupation list 101, whether a function resource is already occupied by a terminal. For example, the function resource occupation list 101 shown in Table 101 includes the identifier 1001 of the function resource, and an identifier of a terminal corresponding to 1001 is A, so that the wearable device can determine that the function resource whose identifier is 1001 is already occupied by the terminal A. If an identifier of a corresponding function resource is not found in Table 101, or an identifier of a terminal corresponding to a found identifier of a function resource is null or other invalid information, it may be determined that the function resource is not occupied or used by any terminal.

Specifically, the wearable device 10 further includes a communications interface 102, a processor 103, and a memory 104.

The communications interface 102 is configured to communicate with an external device wirelessly connected to the wearable device 10. The memory 104 is configured to store the function resource list 100 and the function resource occupation list 101, and may also be configured to store a software program and an application module. The processor 103 is configured to run or execute the software program and the application module that are stored in the memory 104, so as to perform various functions of the wearable device 10.

Optionally, the wearable device 10 further includes a display screen 105. The display screen 105 is configured to implement interaction between the user and the wearable device 10.

After establishing a connection to the wearable device 10, the terminal 11 in the communications system communicates with the wearable device 10, so that the terminal 11 uses a function resource in the wearable device 10, thereby implementing a corresponding function.

Specifically, the terminal 11 includes a communications interface 110, a processor 111, a memory 112, and a display screen 113.

The communications interface 110 is configured to communicate with the wearable device 10 connected to the terminal 11. The memory 112 may be configured to store a software program and an application module. The processor 111 is configured to run or execute the software program and the application module that are stored in the memory 112, so as to perform various functions of the terminal 11. The display screen 113 is configured to implement interaction between the user and the terminal 11.

In this embodiment of this application, an example in which the terminal and the wearable device including the display screen are in a Bluetooth connection is used for detailed description. In this embodiment of this application, the terminal may occupy and use a plurality of function resources in the wearable device. Each terminal may request the wearable device to distribute a function resource to the terminal. For ease of understanding, in this embodiment of this application, an example in which a first terminal requests the wearable device to distribute a first function resource to the first terminal is used for description. The first function resource may be used to implement functions such as detecting a movement (such as running or walking) of a user, sign data (such as a heart rate or blood pressure) of the user, and a place at which the user is currently located (that is, a location at which the user is currently located).

A method for requesting, by the first terminal, the wearable device to distribute the first function resource to the first terminal may be that the first terminal obtains a state of the first function resource first, and then the first terminal determines, based on the state of the first function resource, whether to request the wearable device to distribute the first function resource to the first terminal; or may be that after establishing a connection to the wearable device, the first terminal directly sends a distribution request to the wearable device, to request the wearable device to distribute the first function resource to the first terminal. Herein, an example in which the first terminal obtains the state of the first function resource first, and then the first terminal determines, based on the state of the first function resource, whether to request the wearable device to distribute the first function resource to the first terminal is used for description.

Figure 3A:
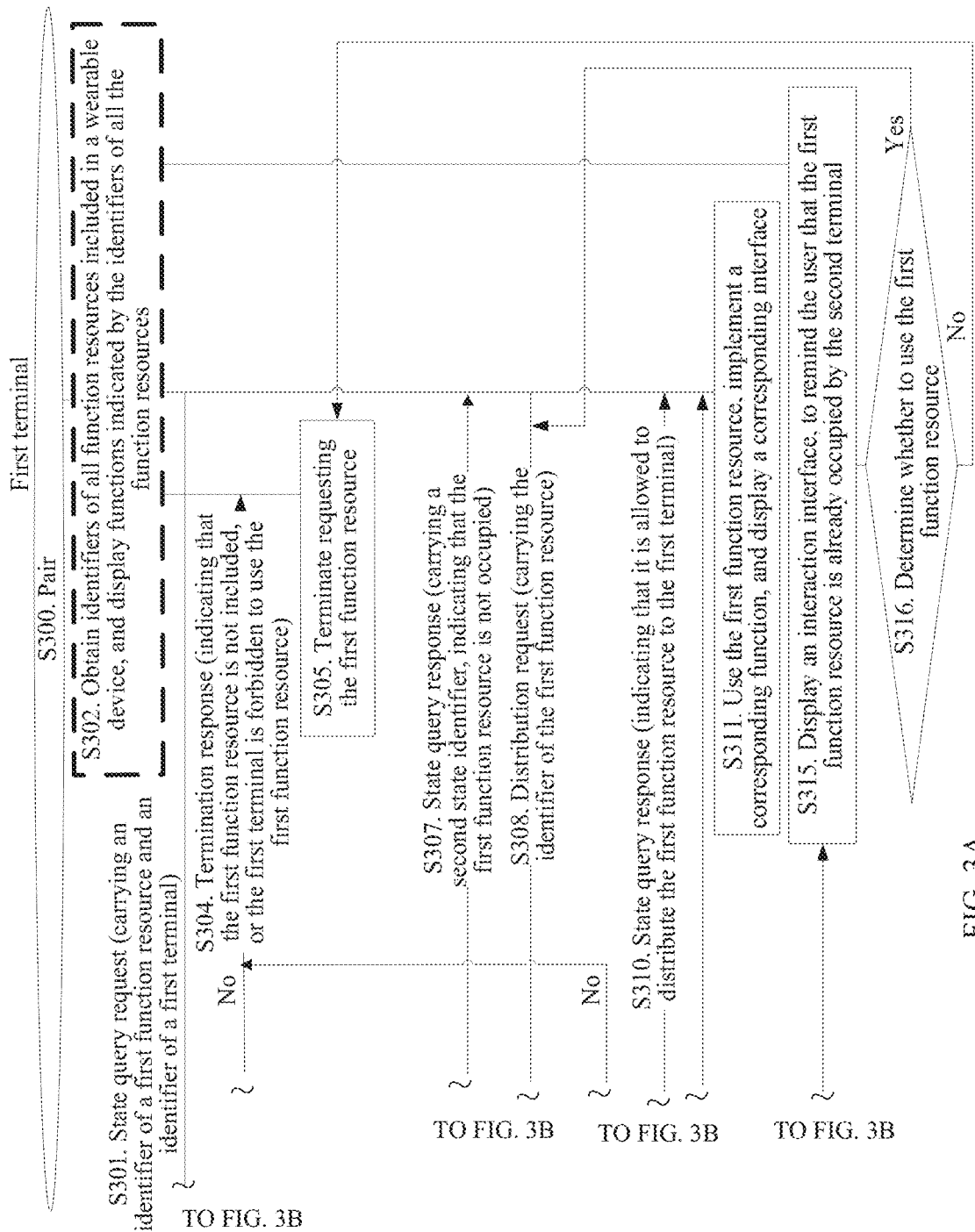
FIG. 3A and FIG. 3B are a first schematic flowchart of a function resource configuration method according to an embodiment of this application.
Figure 3B:
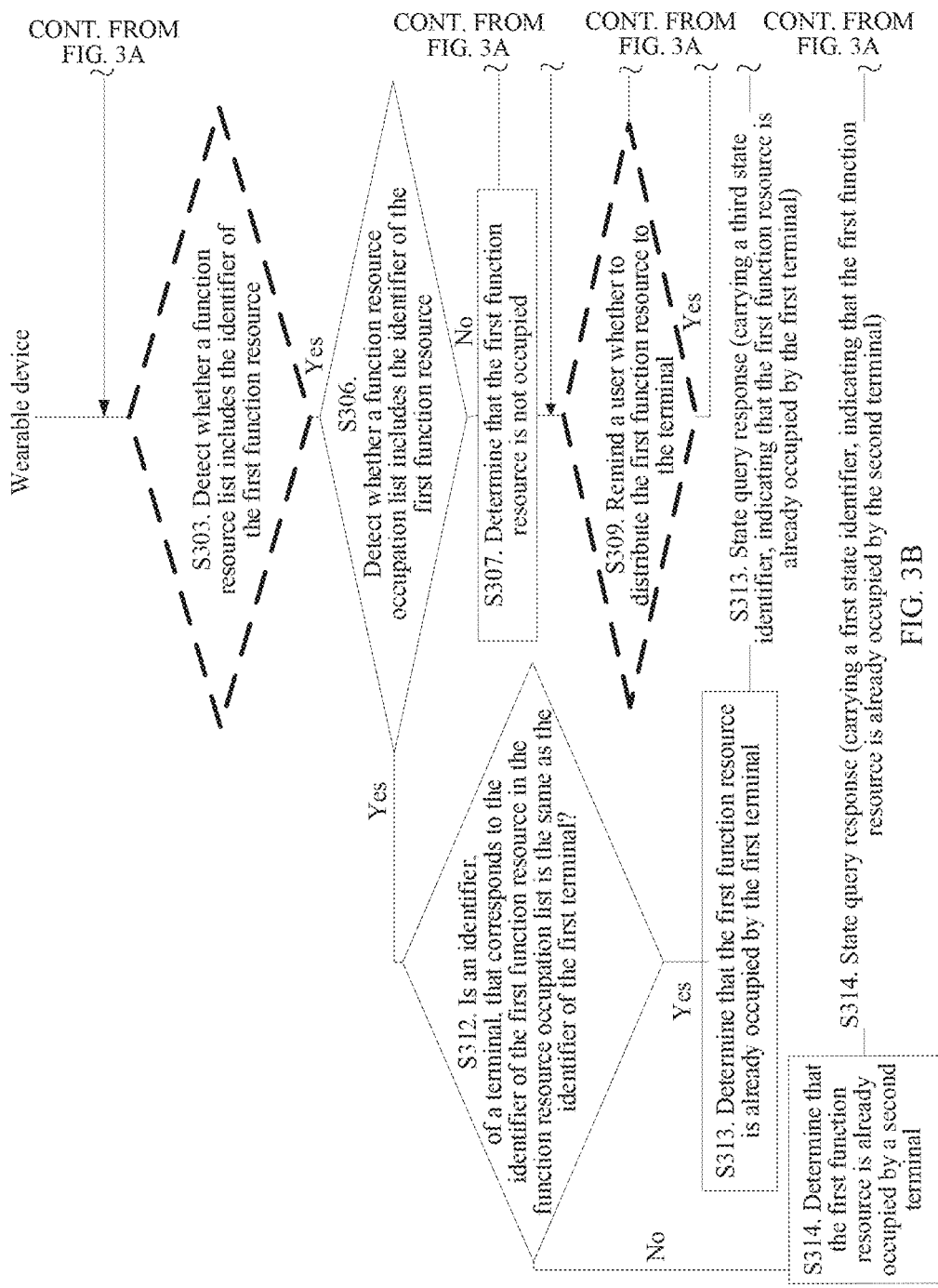

FIG. 3A and FIG. 3B are a schematic flowchart of a function resource configuration method according to an embodiment of this application. The function resource configuration method may be applied to the communications system shown in FIG. 1 or FIG. 2.

Referring to FIG. 3A and FIG. 3B, the function resource configuration method includes the following steps.

S300: Pair a wearable device with a first terminal.

In this embodiment of this application, a manner of pairing the wearable device with the first terminal may be a BR (Basic Rate, a conventional Bluetooth mode) manner, or may be an NFC manner, or may be a BLE (Bluetooth Low Energy, Bluetooth low energy) manner. This is not specifically limited in this embodiment of this application.

S301: The first terminal sends a state query request carrying an identifier of a first function resource and an identifier of the first terminal to the wearable device.

After being successfully paired with the wearable device, the first terminal communicates with the wearable device, so that the first terminal can use a function resource in the wearable device, thereby implementing a corresponding function.

Specifically, for the first function resource in the wearable device, when using the first function resource, the first terminal may send the state query request carrying the identifier of the first function resource and the identifier of the first terminal to the wearable device first, so that the first terminal can obtain a state of the first function resource and perform subsequent processing based on the state of the first function resource.

In this embodiment of this application, the identifier of the first terminal may be a MAC (Media Access Control, Media Access Control) address of the first terminal, or may be a user account used by client software in the first terminal, or may be another identifier used to indicate the first terminal. This is not specifically limited in this embodiment of this application.

In this embodiment of this application, for the identifier of the first function resource, refer to the foregoing explanations of the function resource, and details are not described herein again.

It is easily understood that, to distinguish between different message types, the state query request in this embodiment of this application further carries a first identifier, and the first identifier is used to indicate that the message is the state query request. Therefore, the state query request carries at least the first identifier, the identifier of the terminal, and the identifier of the first function resource.

It should be noted that a format of the state query request is not specifically limited in this embodiment of this application.

For example, if the format of the state query request is "the first identifier: the identifier of the function resource: the identifier of the terminal", the first identifier is state request (state query), the identifier of the first function resource is 1001, and the identifier of the first terminal is A, the state query request is "state request: 1001: A".

In this embodiment of this application, client software that can perform communication by using a function resource in the wearable device is embedded in the first terminal. The client software may include a common sport and health application.

It should be noted that the client software in this embodiment of this application may be an application embedded in the first terminal, or may be an application provided by a third-party service provider installed by a user. This is not specifically limited in this embodiment of this application.

Specifically, in this embodiment of this application, the sending, by the first terminal, a state query request to the wearable device is applicable to the following two scenarios:

1. After the first terminal is successfully paired with the wearable device, the first terminal communicates with the wearable device, obtains identifiers of all function resources included in the wearable device, and displays all functions included in the wearable device, so that the user of the first terminal learns about the functions included in the wearable device.

In a scenario in which the user selects and triggers to query a first function (a function implemented by the first function resource), the first terminal sends the state query request to the wearable device.

2. After the first terminal is successfully paired with the wearable device, in a scenario in which the user selects and triggers to query a first function, the first terminal sends the state query request to the wearable device.

Specifically, in the first scenario, as shown in FIG. 3A and FIG. 3B, the first terminal further performs S302 after S300 and before S301, and performs S306 after S301.

S302: The first terminal obtains identifiers of all function resources included in the wearable device, and displays functions indicated by the identifiers of all the function resources.

Optionally, in this embodiment of this application, a method for obtaining, by the first terminal, the identifiers of all the function resources included in the wearable device may be that the first terminal sends a function query request based on the Bluetooth SDP (Service Discovery Protocol, Service Discovery Protocol); and correspondingly, the first terminal can receive a response that is sent by the wearable device and that carries the identifiers of all the function resources included in the wearable device, and obtain, based on the response, the identifiers of all the function resources included in the wearable device.

For a process of obtaining, by the first terminal, the identifiers of all the function resources included in the wearable device, refer to a process of obtaining, by any terminal, an identifier of a function resource by using the Bluetooth SDP in the prior art, and details are not described herein again.

It should be noted that in this embodiment of this application, the method for obtaining, by the first terminal, identifiers of all function resources included in the wearable device may alternatively be any other service discovery method in the prior art, for example, a GATT (Generic Attribute Profile, generic attribute profile) discovery process. This is not specifically limited in this embodiment of this application.

Because S302 is an optional step, S302 is represented by using a dashed line box in FIG. 3A and FIG. 3B.

Specifically, in the second scenario, as shown in FIG. 3A and FIG. 3B, after performing S301, the first terminal performs S303.

S303: The wearable device detects whether a function resource list includes the identifier of the first function resource.

It can be learned with reference to the foregoing Table 1 that the function resource list stores the identifiers of all the function resources included in the wearable device. Therefore, the wearable device may determine, based on the function resource list, whether the wearable device includes the first function resource.

Because S303 is an optional step, S303 is represented by using a dashed line box in FIG. 3A and FIG. 3B.

S304: If the function resource list does not include the identifier of the first function resource, the wearable device sends a termination response to the first terminal.

The termination response is used to indicate that the wearable device does not include the first function resource, or is used to indicate that the first terminal is forbidden to use the first function resource.

S305: The first terminal terminates requesting the wearable device to distribute the first function resource to the first terminal.

S306: If the function resource list includes the identifier of the first function resource, the wearable device detects whether a function resource occupation list includes the identifier of the first function resource.

It can be learned with reference to the foregoing Table 2 that the function resource occupation list stores a correspondence between an identifier of a function resource that is already occupied and an identifier of a terminal that occupies the function resource. Therefore, the wearable device may determine, based on the function resource occupation list, which terminal occupies which function resource.

Specifically, if the function resource occupation list does not include the identifier of the first function resource, it indicates that the first function resource is not occupied by any terminal, and in the configuration method provided in this embodiment of this application, S307 to S311 are performed after S306. If the function resource occupation list includes the identifier of the first function resource, it indicates that the first function resource is already occupied by a terminal, and in the configuration method provided in this embodiment of this application, S312 to S316 are performed after S306.

S307: If the function resource occupation list does not include the identifier of the first function resource, the wearable device determines that the first function resource is not occupied, and sends a state query response carrying a second state identifier to the first terminal.

The second state identifier is used to indicate that the first function resource is not occupied by any terminal, that is, the wearable device does not distribute the first function resource to a terminal. Both the first terminal and the wearable device may identify the second state identifier.

For explanations related to the state query response, refer to subsequent content.

S308: The first terminal sends a distribution request to the wearable device.

After receiving the state query response that carries the second state identifier and that is sent by the wearable device, the first terminal learns, based on the second state identifier in the state query response, that the first function resource is not occupied by any terminal. In this way, the first terminal may directly request the wearable device to distribute the first function resource to the first terminal.

Specifically, the first terminal sends the distribution request carrying the identifier of the first function resource to the wearable device, to request the wearable device to distribute the first function resource to the first terminal.

To distinguish between different message types, the distribution request in this embodiment of this application further carries a second identifier, and the second identifier is used to indicate that the message is the distribution request. Therefore, the distribution request carries at least the second identifier and the identifier of the first function resource.

It should be noted that a format of the distribution request is not specifically limited in this embodiment of this application.

For example, if the format of the distribution request is "the second identifier: the identifier of the function resource", the second identifier is request distribution (the distribution request), and the identifier of the first function resource is 1001, the distribution request is "request distribution: 1001".

Optionally, the distribution request may further carry the identifier of the first terminal.

S309: The wearable device displays an interaction interface, to remind a user whether to allow to distribute the first function resource to the first terminal.

S310: If the wearable device allows to distribute the first function resource to the first terminal, the wearable device sends a notification message used to instruct the first terminal to use the first function resource to the first terminal.

S311: The first terminal uses the first function resource, implements a corresponding function, and displays a corresponding interface.

It should be noted that in the configuration method provided in this embodiment of this application, S310 may be directly performed after S308. Therefore, S309 is an optional step, and is represented by using a dashed line box in FIG. 3A and FIG. 3B.

It may be understood that after receiving the distribution request, the wearable device displays the interaction interface, so that the user determines whether to agree to distribute the first function resource to the first terminal. It should be noted that the user herein is a user who uses the wearable device.

For example, if a smartphone requests to use a function of detecting blood pressure of a user in a smartwatch, the smartwatch displays "whether to allow the smartphone to use the function of detecting blood pressure of a user", and displays words "Yes" and "No". In this way, after seeing the displayed information, a user who uses the smartwatch may select "Yes" or "No" to express willingness of the user.

Specifically, when receiving a first instruction that is entered by the user and that is used to indicate that distribution of the first function resource to the first terminal is allowed, the wearable device allows to distribute the first function resource to the first terminal, and sends the notification message to the first terminal, so that the first terminal uses the first function resource. The notification message may be an ACK message, or may be a message that carries the identifier of the first function resource and that is used to indicate an acknowledgment. This is not specifically limited in this embodiment of this application.

Correspondingly, if the wearable device forbids to distribute the first function resource to the first terminal, the wearable device sends the termination response to the first terminal, that is, S304 is performed.

S312: If the function resource occupation list includes the identifier of the first function resource, the wearable device detects whether an identifier, of a terminal, that corresponds to the identifier of the first function resource in the function resource occupation list is the same as the identifier of the first terminal.

It can be learned from the foregoing descriptions that if the function resource occupation list includes the identifier of the first function resource, it indicates that the first function resource is already occupied. In this way, the wearable device may further determine, based on the identifier of the terminal that occupies the first function resource, which terminal already occupies the first function resource.

S313: If the identifier, of the terminal, that corresponds to the identifier of the first function resource in the function resource occupation list is the same as the identifier of the first terminal, the wearable device determines that a state of the first function resource is that the first function resource is already occupied by the first terminal, and sends a state query response carrying a third state identifier to the first terminal.

The third state identifier is used to indicate that the first function resource is already occupied by the first terminal, that is, the wearable device already distributes the first function resource to the first terminal.

It should be noted that a scenario to which the state in which the first function resource is already occupied by the first terminal is applicable is: Before the first terminal is paired with the wearable device this time, the first terminal is already successfully paired with the wearable device, and the first terminal already occupies the first function resource. However, due to some reasons, the first terminal is disconnected from the wearable device.

Specifically, after S313, the first terminal performs S311, that is, after receiving the state query response carrying the third state identifier, the first terminal directly uses the first function resource based on the third state identifier in the state query response, implements the corresponding function, and displays the corresponding interface.

For example, a smartphone is paired with a smartband by using Bluetooth, and the smartphone uses a sport and health function in the smartband. In this way, the smartband stores a correspondence between the sport and health function and the smartphone. At a first moment, a distance between the smartphone and the smartband increases. Consequently, a Bluetooth connection between the smartphone and the smartband is disconnected. At a second moment (the second moment is later than the first moment), the distance between the smartphone and the smartband decreases. The distance may satisfy the Bluetooth connection between the smartphone and the smartband, and no other terminals are connected and use the sport and health function of the smartband between the first moment and the second moment, and then the smartband is reconnected to the smartphone. After the smartband is reconnected to the smartphone, the smartphone can still use the sport and health function.

It should be noted that in this embodiment of this application, that the first function resource is already occupied by the first terminal (the first terminal occupies the first function resource) is different from that the first terminal uses the first function resource. After the wearable device distributes the first function resource to the first terminal, the first terminal may occupy the first function resource. During a period in which the first terminal occupies the first function resource, the first terminal may not use the first function resource. However, during a period in which the first terminal uses the first function resource, the first terminal certainly occupies the first function resource.

S314: If an identifier, of a terminal, corresponding to the identifier of the first function resource in the function resource occupation list is an identifier of a second terminal, and the identifier of the second terminal is different from the identifier of the first terminal, the wearable device determines that the first function resource is already occupied by the second terminal, and sends a state query response carrying a first state identifier to the first terminal, where the first state identifier is used to indicate that the first function resource is already occupied by the second terminal.

For explanations about that the first function resource is already occupied by the second terminal, refer to the foregoing explanations about that the first function resource is already occupied by the first terminal, and details are not described herein again.

S315: The first terminal displays an interaction interface, to notify the user that the first function resource is already occupied by the second terminal.

S316: The first terminal determines whether to use the first function resource.

If the first terminal determines to use the first function resource, S308 is performed, to complete S309, S310, and S311. If the first terminal determines not to use the first function resource, S305 is performed.

It may be understood that after determining that the first function resource is already occupied by the second terminal, the first terminal determines, by displaying the information to the user of the first terminal and based on the instruction entered by the user, whether to use the first function resource.

Specifically, if the first terminal receives a third instruction that is entered by the user and that is used to instruct to request the wearable device to distribute the first function resource to the first terminal, the first terminal determines to occupy the first function resource.

For the interaction interface displayed by the first terminal, refer to the interaction interface displayed by the wearable device, and details are not described herein again.

It can be learned from the foregoing descriptions that in this embodiment of this application, there are the state query response carrying the first state identifier, the state query response carrying the second state identifier, and the state query response carrying the third state identifier. In this embodiment of this application, regardless of which state identifier a state query response carries, the state query response further carries a third identifier and the identifier of the function resource, and the third identifier is used to indicate that the message is the state query response. Therefore, the state query response carries at least the third identifier, the identifier of the function resource, and the state identifier.

It should be noted that a format of the state query response is not specifically limited in this embodiment of this application.

For example, if the format of the state query response is "the third identifier: the identifier of the function resource: the state identifier", the third identifier is state response (the state response), the identifier of the first function resource is 1001, and the first state identifier is state 2, the state query response carrying the first state identifier is "state response: 1001: state 2".

Further, in the configuration method provided in this embodiment of this application, in a scenario in which the first terminal determines to use the first function resource, when performing S310, the wearable device notifies the second terminal that the second terminal cannot continue to occupy the first function resource at this moment, and changes the identifier, of the terminal, that corresponds to the identifier of the first function resource in the function resource occupation list of the wearable device, that is, changes the identifier of the second terminal to the identifier of the first terminal, so as to ensure correctness of the correspondence stored in the function resource occupation list.

In addition, in the scenario in which the first terminal determines to use the first function resource, after the first terminal performs S308, the wearable device may further determine, based on a time in which the second terminal occupies the first function resource (referred to as occupation duration for short), whether to allow the first terminal to use the first function resource. Specifically, if the wearable device detects that the occupation duration is greater than or equal to a preset threshold, the wearable device allows the first terminal to use the first function resource, and performs S310. If the wearable device detects that the occupation duration is less than the preset threshold, the wearable device forbids the first terminal to use the first function resource and performs S304, or may directly perform S309. This is not specifically limited in this embodiment of this application. The determining, by the wearable device in this manner, whether to allow the first terminal to use the first function resource is not shown in FIG. 3A and FIG. 3B.

In addition, in the scenario in which the first terminal determines to use the first function resource, after the first terminal performs S308, the wearable device may alternatively determine, by comparing a priority of the first terminal with a priority of the second terminal, whether to allow the first terminal to use the first function resource. Specifically, if the priority of the first terminal is higher than the priority of the second terminal, the wearable device allows the first terminal to use the first function resource and performs S310. If the priority of the first terminal is lower than the priority of the second terminal, the wearable device forbids the first terminal to use the first function resource and performs S304, or may directly perform S309. This is not specifically limited in this embodiment of this application. If the priority of the first terminal is equal to the priority of the second terminal, the wearable device may directly allow the first terminal to use the first function resource and perform S310, or may directly perform S309, or may determine, by using another manner, whether to allow the first terminal to use the first function resource. This is not specifically limited in this embodiment of this application. Similarly, the determining, by the wearable device in this manner, whether to allow the first terminal to use the first function resource is not shown in FIG. 3A and FIG. 3B.

Optionally, the priority of the first terminal and the priority of the second terminal may be set by the user of the wearable device. For example, if the user of the wearable device sets that when the first terminal applies to use a function of detecting blood pressure of a user in the wearable device, the first terminal is always allowed to use the function of detecting blood pressure of a user; and the user of the wearable device sets that when the second terminal applies to use the function of detecting blood pressure of a user in the wearable device, a box is popped up first to ask the user whether to allow the second terminal to use the function of detecting blood pressure of a user. In this way, the priority of the first terminal is higher than the priority of the second terminal.

Optionally, the user may set different priorities or permissions for different terminals on the wearable device. The user of the wearable device may set that the first terminal and the second terminal are always allowed to use the function of detecting blood pressure of a user. If the first terminal already occupies a function resource for detecting blood pressure of a user, when the second terminal applies to use the function of detecting blood pressure of a user, the wearable device may directly allow the second terminal to use the function of detecting blood pressure of a user without displaying the interaction interface. For example, a user may set, on a smartwatch, that a mobile phone 1 and a mobile phone 2 of the user are always allowed to use all function resources or some function resources in the smartwatch. In this way, the user may smoothly switch the mobile phone to view or use some function resources in the smartwatch without confirming on a display interface for a plurality of times, thereby improving user experience. In addition, the user may set different permissions for mobile phones of other users on the wearable device. For example, the user may allow a mobile phone of another user such as a personal trainer or a personal doctor to use a function resource in the smartwatch, but use of the function resource needs to be confirmed by the user.

Further, in this embodiment of this application, when determining that the first terminal does not use the first function resource any more, the first terminal may send a connection termination message to the wearable device, to disconnect the wearable device from the first terminal, so that the first function resource in the wearable device is released. Correspondingly, the wearable device deletes the correspondence between the identifier of the first function resource and the identifier of the first terminal from the function resource occupation list of the wearable device.

Optionally, the first function resource in this embodiment of this application may be a resource with a user attribute, or may be a resource without a user attribute. A resource with a user attribute may be construed as a function resource that needs to obtain and/or store related data corresponding to a user during running. For example, during running, a function resource used to implement a function of detecting blood pressure of a user needs to obtain and/or store data indicating the blood pressure of the user. Correspondingly, a resource without a user attribute may be construed as a function resource that does not need to obtain and/or store related data corresponding to a user during running, for example, a Bluetooth earphone function resource. The Bluetooth earphone function resource is only used to implement a call function of a user, and does not need to store related data. The music play function resource is only used to implement a function of playing music for a terminal, and does not need to store related data of a user.

Optionally, in an application scenario in which the wearable device does not include a display screen, if a terminal requests the wearable device to distribute the first function resource to the terminal, the wearable device may remind a user by using vibration, ringing, or a combination of vibration and ringing. The user of the wearable device may express, by using knocking or shaking, whether the user agrees to distribute the first function resource to the terminal.

In this embodiment of this application, the wearable device includes at least one function resource. For the first function resource in the at least one function resource, even if the first function resource is already occupied by the second terminal, after receiving the distribution request sent by the first terminal, the wearable device also determines, based on the distribution request received by the wearable device, whether to allow the first terminal to use the first function resource. If the wearable device allows the first terminal to use the first function resource, the wearable device sends the notification message to the first terminal, to instruct the first terminal to use the first function resource. In this way, in a scenario in which the first function resource is already occupied by the second terminal, the first terminal may also use the first function resource.

To describe the function resource configuration method shown in FIG. 3A and FIG. 3B in a more detailed manner, in this embodiment of this application, the following example is used for description: The wearable device is a smartwatch A including a display screen; the smartwatch A includes a function resource for detecting blood pressure of a user, a function resource for detecting a heart rate of the user, and a function resource for detecting walking of the user; both the smartphone 1 and the smartphone 2 are paired with the smartwatch A in a BLE manner; after being successfully paired with the smartwatch A, both the smartphone 1 and the smartphone 2 obtain identifiers of all function resources included in the smartwatch A; and the smartwatch A determines, based on an instruction entered by the user, whether to distribute a function resource to the smartphone 1 or the smartphone 2.

With reference to Table 1, in this embodiment of this application, a function resource 1001 is used to indicate the function resource for detecting blood pressure of a user, a function resource 1002 is used to indicate the function resource for detecting walking of the user, and a function resource 1003 is used to indicate the function resource for detecting a heart rate of the user.

Figure 4A:
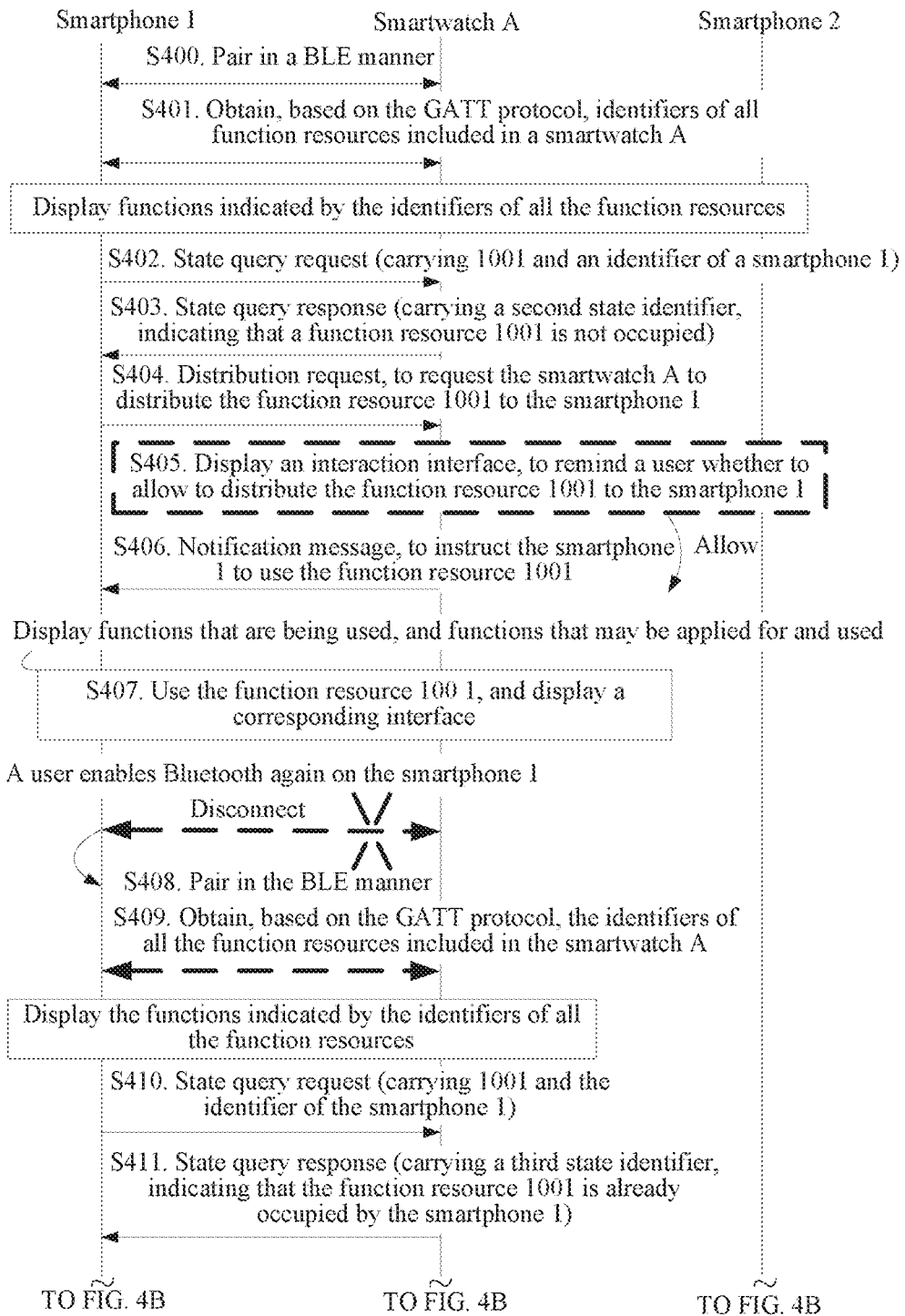
FIG. 4A and FIG. 4B are a second schematic flowchart of a function resource configuration method according to an embodiment of this application.
Figure 4B:
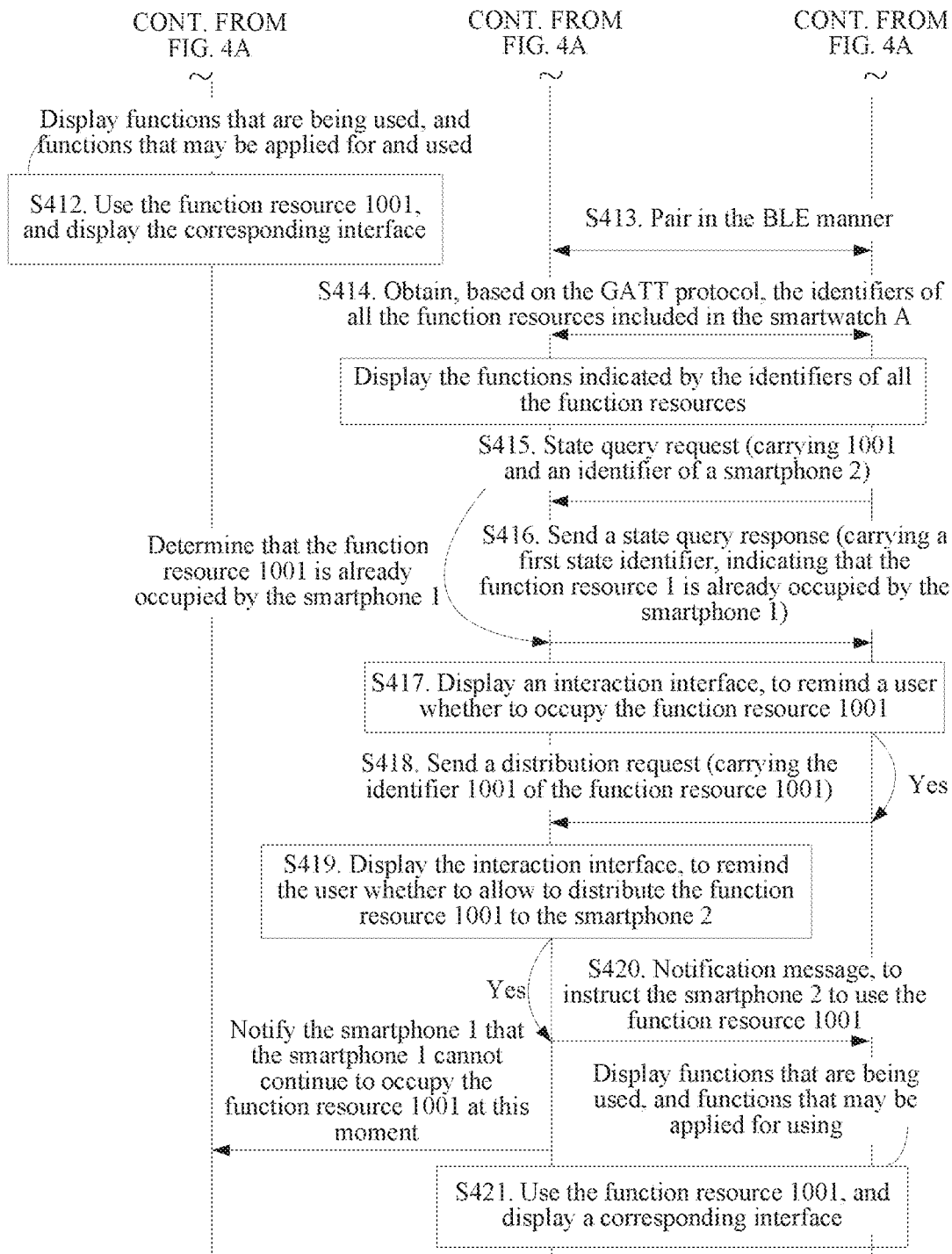

Referring to FIG. 4A and FIG. 4B, a function resource configuration method according to an embodiment of this application includes the following steps.

S400: A smartphone 1 is paired with a smartwatch A in a BLE manner.

For a specific method for pairing the smartphone 1 with the smartwatch A in the BLE manner, refer to a process of pairing any two different terminals in a BLE manner in the prior art, and details are not described herein.

S401: The smartphone 1 obtains, based on the GATT protocol, identifiers of all function resources included in the smartwatch A, and displays functions indicated by the identifiers of all the function resources.

Specifically, the smartphone 1 sends a function query request to the smartwatch A based on the GATT protocol, and the smartwatch A sends, to the smartphone 1 based on the function query request, a response carrying the identifiers of all the function resources included in the smartwatch A. In this way, the smartphone 1 may obtain the identifiers of all the function resources included in the smartwatch A. After obtaining the identifiers of all the function resources included in the smartwatch A, the smartphone 1 displays the functions included in the smartwatch A on a display screen of the smartphone 1, so that a user of the smartphone 1 can intuitively learn about, by using the smartphone 1, the functions included in the smartwatch A.

In this embodiment of this application, an area in which the smartphone 1 displays the functions included in the smartwatch A may be any area of the display screen of the smartphone 1. This is not specifically limited in this embodiment of this application. In addition, a manner of displaying, by the smartphone 1, the functions included in the smartwatch A may be a list form or an icon form. This is not specifically limited in this embodiment of this application.

Figure 5:
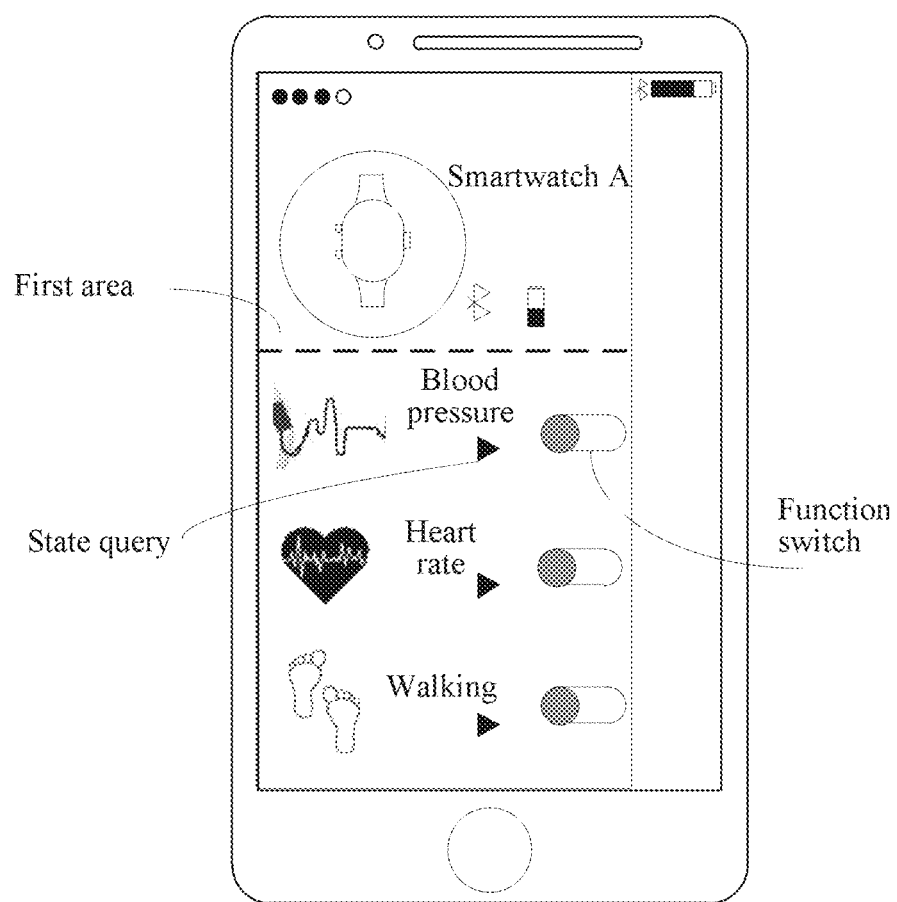
FIG. 5 is an interaction interface 1 displayed by a smartphone 1 according to an embodiment of this application.

As shown in FIG. 5, in this embodiment of this application, after obtaining the identifiers of all the function resources included in the smartwatch A, the smartphone 1 displays, in the list form in a first area of the display screen of the smartphone 1, that the smartwatch A includes a function of detecting blood pressure, a function of detecting a heart rate, and a function of detecting walking. The display interface shown in FIG. 5 includes a function switch control, a state query control, an icon of the smartwatch A, an icon of detecting blood pressure, an icon of detecting a heart rate, an icon of detecting walking, and another common icon. The user may learn, by viewing the interface shown in FIG. 5, that the smartwatch A includes the function of detecting blood pressure, the function of detecting a heart rate, and the function of detecting walking.

For a detailed process of obtaining, by the smartphone 1, the identifiers of all the function resources included in the smartwatch A, refer to a process of obtaining, by any terminal, an identifier of a function resource based on the GATT protocol in the prior art, and details are not described herein.

S402: The smartphone 1 sends a state query request carrying an identifier 1001 of a function resource and an identifier of the smartphone 1 to the smartwatch A.

Specifically, after the smartphone 1 displays the functions included in the smartwatch A, the user of the smartphone 1 may select one of the functions, and trigger the smartphone 1 to query a state of a function resource corresponding to the function from the smartwatch A. With reference to FIG. 5, the user taps a state query control of one of the functions, to trigger the smartphone 1 to query a state of a function resource corresponding to the state query control from the smartwatch A.

Figure 6:
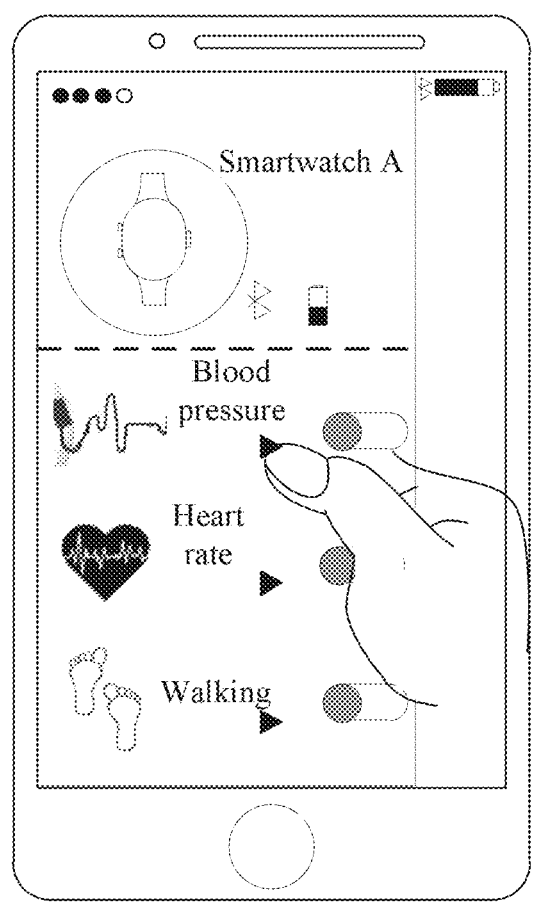
FIG. 6 is an interaction interface 2 displayed by a smartphone 1 according to an embodiment of this application.

In this embodiment of this application, an example in which the smartphone 1 sends the state query request carrying the identifier 1001 of the function resource and the identifier of the smartphone 1 to the smartwatch A is used for description. The function resource 1001 is used to detect blood pressure. With reference to FIG. 5, as shown in FIG. 6, the user taps a state query control of a function of detecting blood pressure, to trigger the smartphone 1 to send the state query request carrying the identifier 1001 of the function resource and the identifier of the smartphone 1 to the smartwatch A.

S403: When determining, based on the identifier 1001 of the function resource and a function resource occupation list, that the function resource 1001 is not occupied by any terminal, the smartwatch A sends a state query response carrying a second state identifier to the smartphone 1, where the second state identifier is used to indicate that the function resource 1001 is not occupied by any terminal.

The smartwatch A stores the function resource occupation list. For the function resource occupation list, refer to the foregoing Table 2. The smartwatch A may determine, based on the function resource occupation list, whether the function resource 1001 is already occupied by a terminal, that is, the smartwatch A may determine a state of the function resource 1001 based on the function resource occupation list.

For a method for determining, by the smartwatch A, the state of the function resource 1001, refer to the embodiment of FIG. 3A and FIG. 3B, and details are not described herein again.

Specifically, when determining that the function resource 1001 is not occupied by any terminal, the smartwatch A sends the state query response carrying the second state identifier to the smartphone 1. The second state identifier is used to indicate that the function resource 1001 is not occupied by any terminal.

For example, in this embodiment of this application, the second state identifier is Status 0 (state 0), the smartwatch A sends a state query response carrying Status 0 to the smartphone 1, to notify the smartphone 1 that the function resource 1001 is not occupied by any terminal.

Correspondingly, the smartphone 1 displays that the function of detecting blood pressure is not occupied. With reference to FIG. 6, as shown in FIG. 7, if the function resource 1001 is not occupied by any terminal, the smartphone 1 displays that the function resource 1001 is not occupied.

S404: The smartphone 1 sends a distribution request to the smartwatch A, to request the smartwatch A to distribute the function resource 1001 to the smartphone 1.

Specifically, after the smartphone 1 displays that the function resource 1001 is not occupied by any terminal, the user of the smartphone 1 may select to apply for using the function of detecting blood pressure, and trigger the smartphone 1 to send the distribution request to the smartwatch A, to request the smartwatch A to distribute the function resource 1001 to the smartphone 1.

Figure 7:
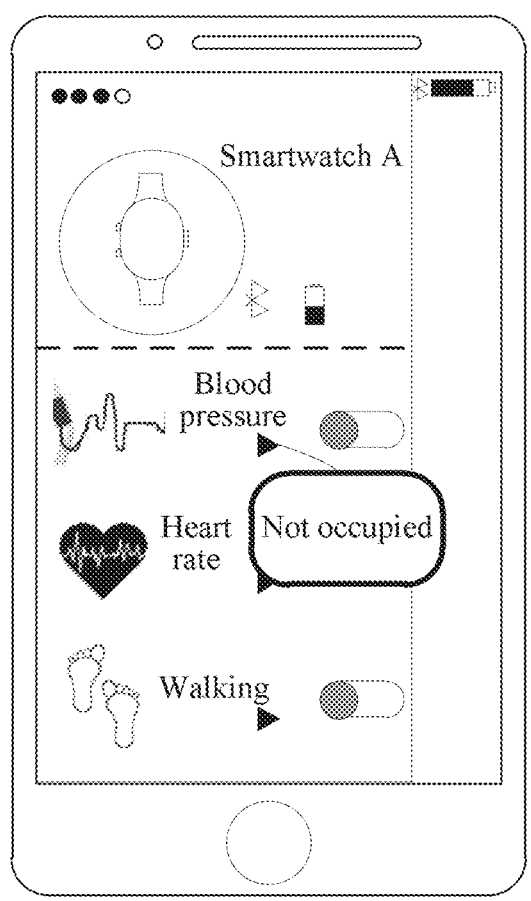
FIG. 7 is an interaction interface 3 displayed by a smartphone 1 according to an embodiment of this application.
Figure 8:
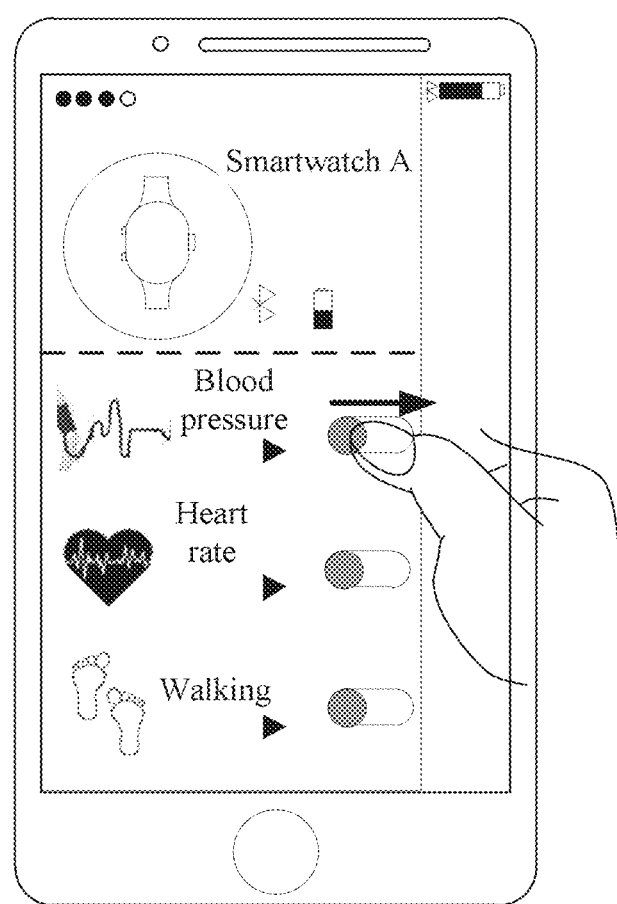
FIG. 8 is an interaction interface 4 displayed by a smartphone 1 according to an embodiment of this application.

With reference to FIG. 7, as shown in FIG. 8, the user slides a function switch control of the function of detecting blood pressure, to trigger the smartphone 1 to send the distribution request to the smartwatch A, to request to use the function of detecting blood pressure.

S405: The smartwatch A displays an interaction interface, to remind a user whether to allow to distribute the function resource 1001 to the smartphone 1.

It is easily understood that, that the smartwatch A reminds the user whether to allow to distribute the function resource 1001 to the smartphone 1 is essentially reminding the user whether to allow the smartphone 1 to use the function of detecting blood pressure corresponding to the function resource 1.

Figure 9:
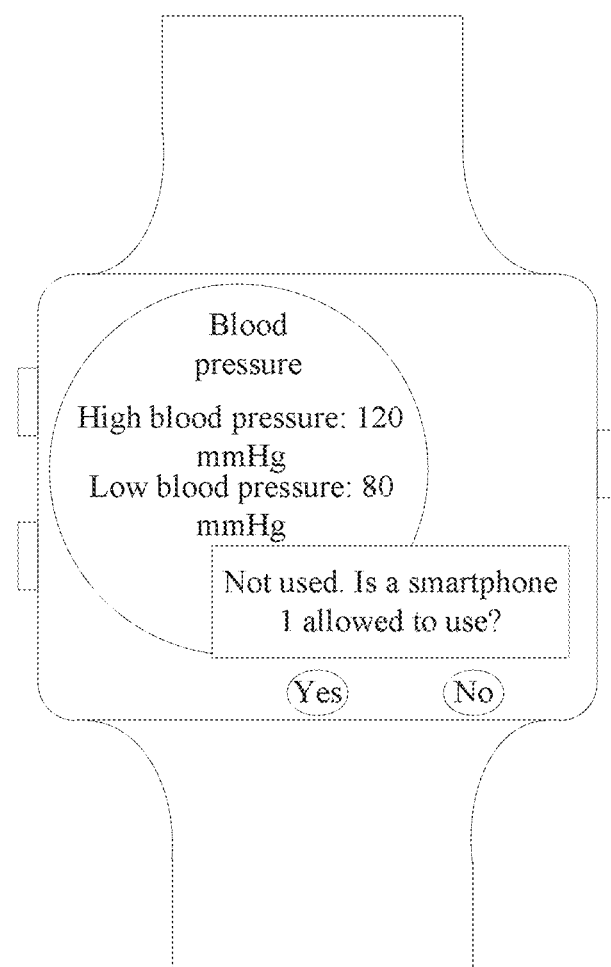
FIG. 9 is an interaction interface 1 displayed by a wearable device according to an embodiment of this application.

For example, as shown in FIG. 9, after receiving the distribution request, the smartwatch A displays "The function of detecting blood pressure is not used, whether to allow the smartphone 1 to use the function of detecting blood pressure?" on a blood pressure display interface based on the distribution request, and displays two controls "Yes" and "No". It may be understood that when the smartphone 1 applies to use the function resource 1, if the function resource 1001 is not occupied or used by any terminal, the smartwatch A may alternatively directly agree the request of the smartphone 1 to allow the smartphone 1 to use the function resource 1001 without displaying the user interaction interface.

S406: If the smartwatch A allows to distribute the function resource 1001 to the smartphone 1, the smartwatch A sends a notification message to the smartphone 1, to instruct the smartphone 1 to use the function resource 1001.

It can be learned from S405 that the smartwatch A may determine, based on an instruction entered by the user, whether to allow to distribute the function resource 1001 to the smartphone 1.

Specifically, with reference to FIG. 9, if the user taps "Yes", the smartwatch A allows to distribute the function resource 1001 to the smartphone 1, and the smartwatch A sends the notification message to the smartphone 1, to instruct the smartphone 1 to use the function resource 1001. If the user taps "No", the smartwatch A forbids to distribute the function resource 1001 to the smartphone 1, and the smartwatch A sends a termination response to the smartphone 1, to indicate that the smartwatch A forbids the smartphone 1 to use the function resource 1001. In FIG. 4A and FIG. 4B, a case in which the smartphone 1 is forbidden to use the function resource 1001 is not shown.

The smartwatch A reminds the user whether to allow to distribute the function resource 1001 to the smartphone 1, and determines, based on a selection of the user, a manner of sending the notification message or the termination response to the smartphone 1, thereby ensuring security of the function resource 1001, and improving user experience.

When the smartwatch A allows to distribute the function resource 1001 to the smartphone 1, the smartwatch A stores a correspondence between the function resource 1001 and the smartphone 1 in the function resource occupation list, to indicate that the function resource 1001 is already occupied by the smartphone 1.

It should be noted that in the configuration method provided in this embodiment of this application, S406 may be directly performed after S404. Therefore, S405 is an optional step, and is represented by using a dashed line box in FIG. 4A and FIG. 4B.

S407: The smartphone 1 uses the function resource 1001 based on the notification message received by the smartphone 1, to implement a function of detecting blood pressure, and displays a corresponding interface.

After receiving the notification message used to instruct the smartphone 1 to use the function resource 1001, the smartphone 1 may use the function resource 1001 based on the notification message. In addition, the smartphone 1 may further display functions of the smartwatch A that are being used by the smartphone 1, and functions that the smartphone 1 may attempt to apply for and use.

Figure 10:
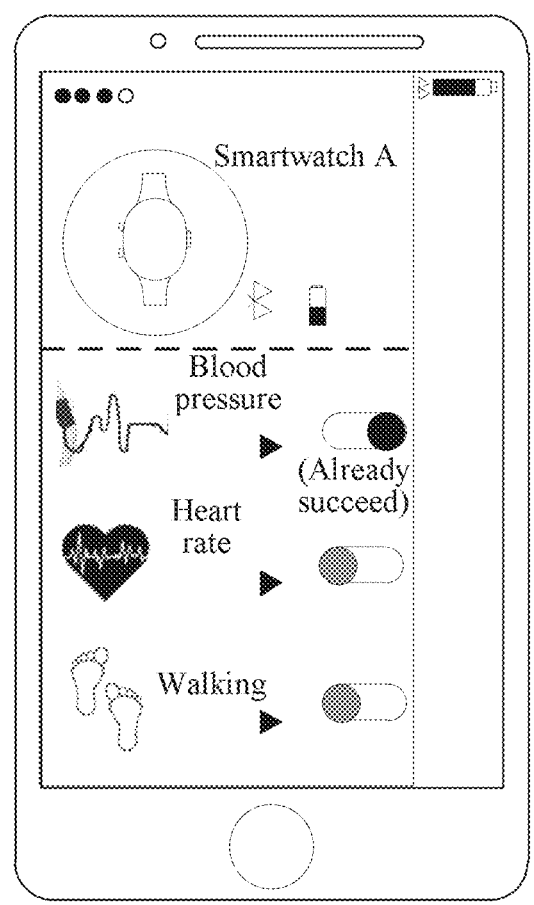
FIG. 10 is an interaction interface 5 displayed by a smartphone 1 according to an embodiment of this application.

For example, with reference to FIG. 8, as shown in FIG. 10, after receiving the notification message, the smartphone 1 displays that the smartphone 1 already successfully occupies a function resource for detecting blood pressure, and the user may further apply for using respectively corresponding functions by sliding a function switch control of the function of detecting a heart rate and a function switch control of the function of detecting walking.

Further, it is assumed that the smartphone 1 is disconnected from the smartwatch A, for example, a Bluetooth function of the smartphone 1 is disabled for two minutes, and there are no other terminals applying for using the function resource 1001 within the two minutes. After the two minutes, the Bluetooth function of the smartphone 1 is enabled again. Then, S408 to S412 are performed between the smartphone 1 and the smartwatch A. Because S409 is an optional step, S409 is represented by using a dashed line in FIG. 4A and FIG. 4B.

S408: The smartphone 1 is paired with the smartwatch A in the BLE manner.

S409: The smartphone 1 obtains, based on the GATT protocol, the identifiers of all the function resources included in the smartwatch A, and displays the functions indicated by the identifiers of all the function resources.

S410: The smartphone 1 sends a state query request carrying the identifier 1001 of the function resource and the identifier of the smartphone 1 to the smartwatch A.

S408 to S410 are the same as S400 to S402 in this embodiment of this application, and details are not described herein again.

S411: When determining, based on the identifier 1001 of the function resource and the function resource occupation list, that the function resource 1001 is already occupied by the smartphone 1, the smartwatch A sends a state query response carrying a third state identifier to the smartphone 1, where the third state identifier is used to indicate that the function resource 1001 is already occupied by the smartphone 1.

Specifically, after receiving the state query request carrying the identifier 1001 of the function resource and the identifier of the smartphone 1, the smartwatch A queries the function resource occupation list stored by the smartwatch A, to determine whether the function resource 1001 is already occupied by a terminal.

Before the two minutes, the smartphone 1 already occupies the function resource 1001, and no other terminals occupy the function resource 1001 within the two minutes during which a Bluetooth connection between the smartphone 1 and the smartwatch A is disconnected. Therefore, the identifier 1001 of the function resource in the function resource occupation list stored by the smartwatch A still corresponds to the smartphone 1. In this way, the smartwatch A determines, based on the identifier 1001 of the function resource and the function resource occupation list, that the function resource 1001 is already occupied by the smartphone 1.

After determining that the function resource 1001 is already occupied by the smartphone 1, the smartwatch A sends the state query response carrying the third state identifier to the smartphone 1, to notify the smartphone 1 that the function resource 1001 is already occupied by the smartphone 1.

For example, in this embodiment of this application, the third state identifier is Status 1 (state 1), the smartwatch A sends a state query response carrying Status 1 to the smartphone 1, to notify the smartphone 1 that the function resource 1001 is already occupied by the smartphone 1.

S412: The smartphone 1 uses the function resource 1001 based on the third state identifier, to implement the function of detecting blood pressure of the user, and displays the corresponding interface.

The smartphone 1 learns, based on the third state identifier, that the smartphone 1 already occupies the function resource 1001. Therefore, the smartphone 1 may implement the function of detecting blood pressure of the user by directly using the function resource 1001. S412 is the same as S407, and details are not described herein again.

Generally, a process of S408 to S412 may be: A function switch of the function of detecting blood pressure in the smartphone 1 is already enabled, and the smartphone 1 already uses the function of detecting blood pressure. Because a distance between the smartphone 1 and the smartwatch A increases, the Bluetooth connection between the smartphone 1 and the smartwatch A is disconnected. During a process in which the Bluetooth connection is disconnected, no other terminals apply for using the function of detecting blood pressure. Because the function switch of the function of detecting blood pressure in the smartphone 1 is not disabled, after the smartphone 1 is reconnected to the smartwatch A, the smartphone 1 may directly use the function of detecting blood pressure again.

Further, if in a process in which the smartphone 1 occupies the function resource 1001, a smartphone 2 is paired with the smartwatch A in the BLE manner, and the smartphone 2 requests the smartwatch A to distribute the function resource 1001 to the smartphone 2, the smartwatch A and the smartphone 2 perform S413 to S421.

S413: A smartphone 2 is paired with the smartwatch A in the BLE manner.

S414: The smartphone 2 obtains, based on the GATT protocol, the identifiers of all the function resources included in the smartwatch A, and displays the functions indicated by the identifiers of all the function resources.

S415: The smartphone 2 sends a state query request carrying the identifier 1001 of the function resource and an identifier of the smartphone 2 to the smartwatch A.

A principle of S413 to S415 is the same as that of S400 to S402 in this embodiment of this application, and details are not described herein again. A difference lies in that S400 to S402 are performed by the smartphone 1, and S413 to S415 are performed by the smartphone 2.

S416: When determining, based on the identifier 1001 of the function resource and the function resource occupation list, that the function resource 1001 is already occupied by the smartphone 1, the smartwatch A sends a state query response carrying a first state identifier to the smartphone 2, where the first state identifier is used to indicate that the function resource 1001 is already occupied by the smartphone 1.

It can be learned with reference to the foregoing descriptions that in the function resource occupation list stored by the smartwatch A, the identifier 1001 of the function resource corresponds to the smartphone 1. In this way, the smartwatch A determines, based on the identifier 1001 of the function resource and the function resource occupation list, that the function resource 1001 is already occupied by the smartphone 1.

After determining that the function resource 1001 is already occupied by the smartphone 1, the smartwatch A sends the state query response carrying the first state identifier to the smartphone 2, to notify the smartphone 2 that the function resource 1001 is already occupied by another smartphone.

For example, in this embodiment of this application, the first state identifier is Status 2 (state 2), the smartwatch A sends a state query response carrying Status 2 to the smartphone 2, to notify the smartphone 2 that the function resource 1001 is already occupied by another smartphone.

S417: The smartphone 2 displays an interaction interface based on the first state identifier, to remind a user whether to use the function resource 1001.

Figure 11:
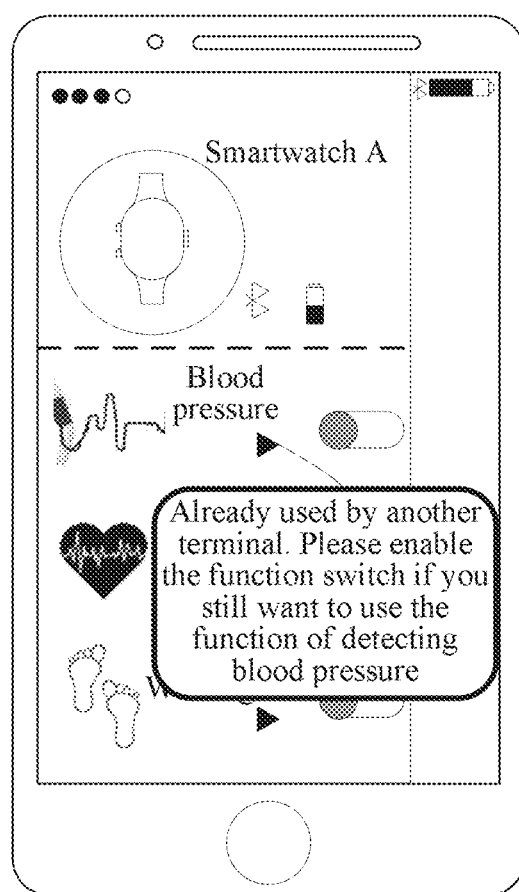
FIG. 11 is an interaction interface displayed by a smartphone 2 according to an embodiment of this application.

For example, as shown in FIG. 11, after receiving a second notification carrying the first state identifier, the smartphone 2 displays "Already used by another terminal. Please enable the function switch if you still want to use the function of detecting blood pressure" based on the first state identifier.

S418: If the smartphone 2 determines to preempt the function resource 1001, the smartphone 2 sends a distribution request carrying the identifier 1001 of the function resource to the smartwatch A, to request the smartwatch A to distribute the function resource 1001 to the smartphone 2.

It is easily understood that the smartphone 2 determines, based on an instruction entered by the user, whether to preempt the function resource 1001. With reference to FIG. 11, if the user enables a function switch of the function of detecting blood pressure, the smartphone 2 determines to preempt the function resource 1001; or if the user does not slide a function switch of the function of detecting blood pressure, the smartphone 2 determines not to preempt the function resource 2, so that the smartphone 2 terminates requesting the function resource 1001.

S419: The smartwatch A displays the interaction interface, to remind the user whether to allow to distribute the function resource 1001 to the smartphone 2.

Figure 12:
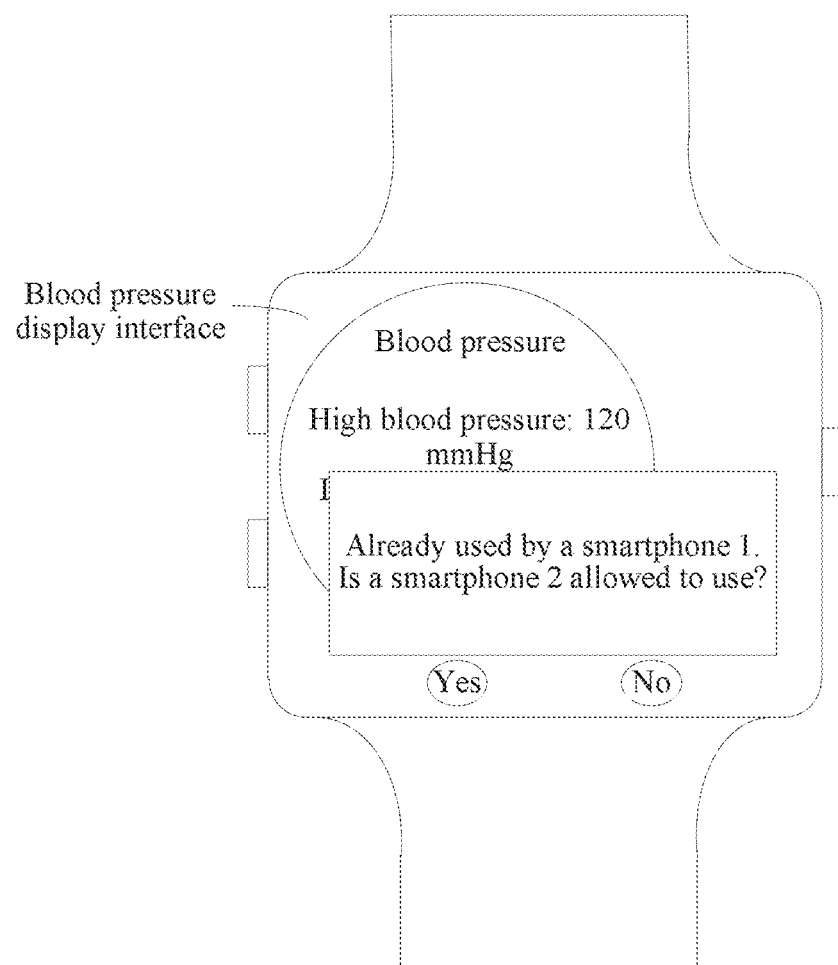
FIG. 12 is an interaction interface 2 displayed by a wearable device according to an embodiment of this application.

For example, as shown in FIG. 12, after receiving the distribution request, the smartwatch A displays "Already used by the smartphone 1. Is the smartphone 2 allowed to use?" on the blood pressure display interface based on the distribution request, and displays two controls "Yes" and "No".

S420: If the smartwatch A allows to distribute the function resource 1001 to the smartphone 2, the smartwatch A sends a notification message to the smartphone 2, to instruct the smartphone 2 to use the function resource 1001.

S421: The smartphone 2 uses the function resource 1001 based on the notification message received by the smartphone 2, to implement the function of detecting blood pressure, and displays a corresponding interface.

Figure 13A:
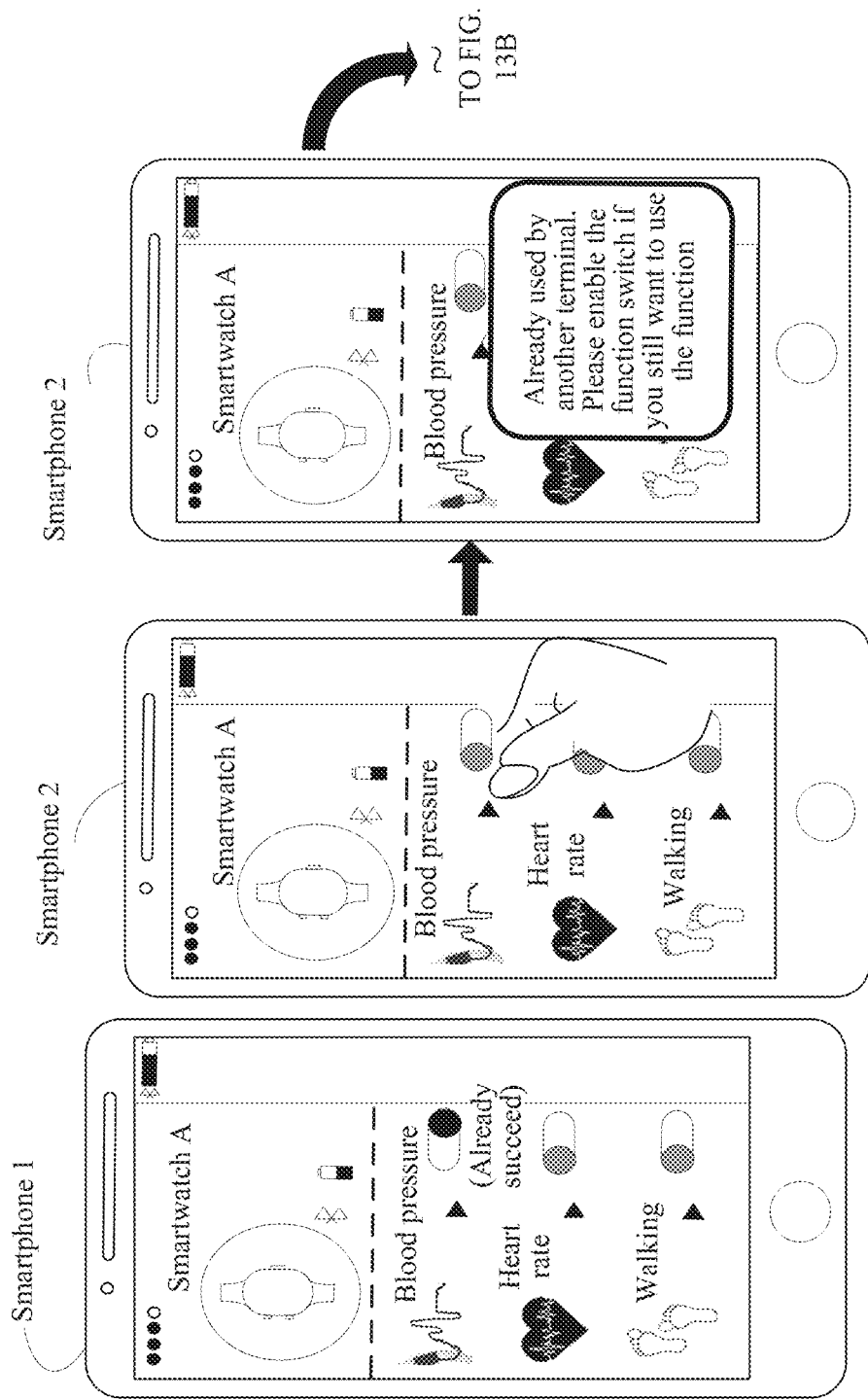
FIG. 13A and FIG. 13B are interaction interfaces displayed by different devices by using interactive collaboration according to an embodiment of this application.
Figure 13B:
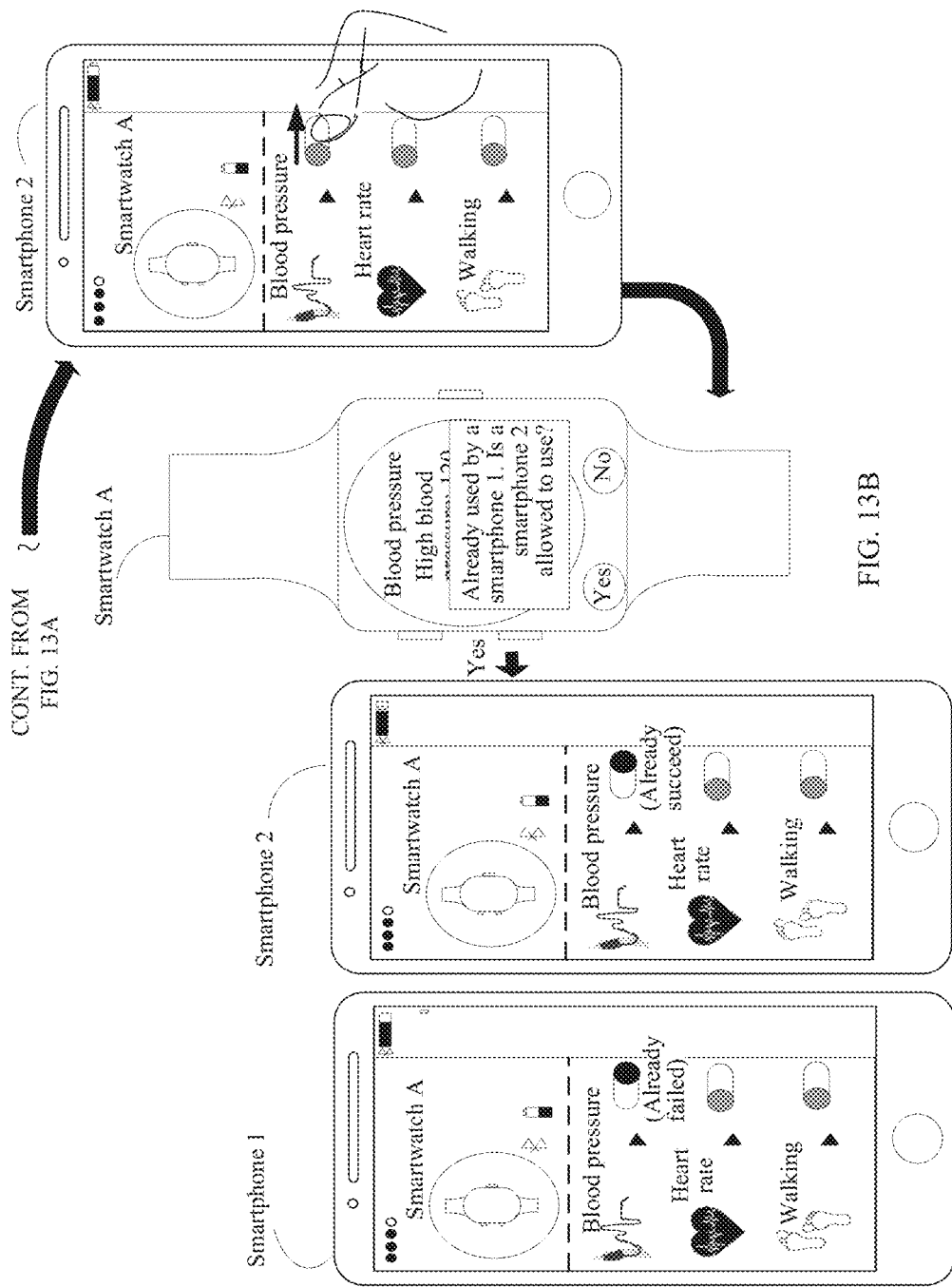

For ease of understanding, FIG. 13A and FIG. 13B show a process in which the function of detecting blood pressure is already occupied by the smartphone 1, and the smartphone 2 successfully preempts the function of detecting blood pressure.

A principle of S419 to S421 is the same as that of S405 to S407 in this embodiment of this application, and details are not described herein again. A difference lies in that communication between the smartwatch A and the smartphone 1 is described in S405 to S407, and communication between the smartwatch A and the smartphone 2 is described in S419 to S421.

When allowing to distribute the function resource 1001 to the smartphone 2, the smartwatch A notifies the smartphone 1 that the smartphone 1 cannot continue to occupy the function resource 1001 at this moment, and further changes the smartphone 1 that corresponds to the identifier 1001 of the function resource in the function resource occupation list to the smartphone 2.

In the function resource configuration method provided in this embodiment of the present invention, the smartphone 1 or the smartphone 2 may request the smartwatch A within a short time to distribute at least two function resources. In this way, the smartwatch A may display distribution requests of the smartphone 1 and/or the smartphone 2 for the function resources in a list form; or may display an interaction interface by superposing a plurality of different windows (each window corresponds to a distribution request); or may display an interaction interface by tiling a plurality of different windows on a display screen of the smartwatch by displaying each window based on a preset proportion; or may display an interaction interface by displaying only one of windows and notifying, in a text form, the user of the rest information corresponding to the distribution request. This is not specifically limited in this embodiment of this application. The foregoing "within a short time" may mean that a preset time is not exceeded, or may mean within a time in which the smartwatch A does not make a response to a previous function resource that is requested to be distributed, or may be another meaning. This is not limited in this embodiment of this application.

It can be learned that by using the function resource configuration method provided in this embodiment of this application, the user of the smartphone 1 or the smartphone 2 may intuitively learn about the functions included in the smartwatch A, and learn about a state of a function resource corresponding to each function, so that the user can determine whether to use a function based on an actual requirement of the user.

In this embodiment of this application, the smartwatch A includes at least one function resource. For the function resource 1001 in the at least one function resource, even if the function resource 1001 is already occupied by the smartphone 1, after receiving the distribution request sent by the smartphone 2, the smartwatch A also determines, based on the distribution request received by the smartwatch A, whether to allow the smartphone 2 to use the function resource 1001. If the smartwatch A allows the smartphone 2 to use the function resource 1001, the smartwatch A sends the notification message to the smartphone 2, to instruct the smartphone 2 to use the function resource 1001. In this way, in a scenario in which the function resource 1001 is already occupied by the smartphone 1, the smartphone 2 may also use the function resource 1001.

It can be learned from the foregoing descriptions that in this embodiment of this application, after establishing a connection to a wearable device including a display screen, a first terminal may directly send a distribution request to the wearable device, to request the wearable device to distribute a first function resource to the first terminal. Herein, an example in which after establishing the connection to the wearable device, the first terminal directly sends the distribution request to the wearable device is used for description.

Figure 14:
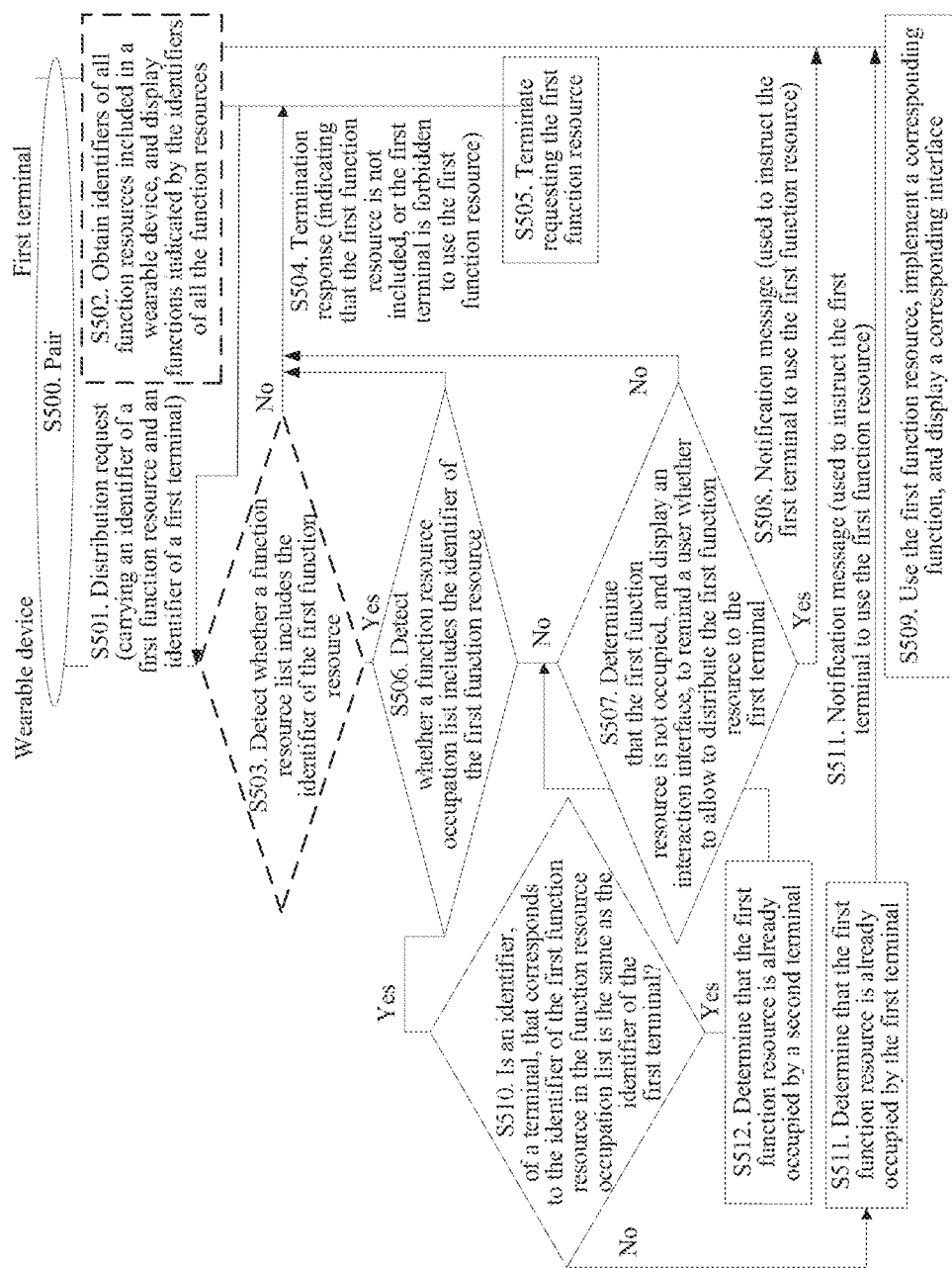
FIG. 14 is a third schematic flowchart of a function resource configuration method according to an embodiment of this application.

FIG. 14 is a schematic flowchart of a function resource configuration method according to an embodiment of this application. The function resource configuration method may be applied to the communications system shown in FIG. 1 or FIG. 2.

Referring to FIG. 14, the function resource configuration method includes the following steps.

S500: A wearable device is paired with a first terminal.

S500 is the same as S300, and details are not described herein again.

S501: The first terminal sends a distribution request carrying an identifier of a first function resource and an identifier of the first terminal to the wearable device.

In this embodiment of this application, after being successfully paired with the wearable device, the first terminal directly sends the distribution request to the wearable device, to request the wearable device to distribute the first function resource to the first terminal.

In this embodiment of this application, for the distribution request sent by the first terminal, refer to descriptions of the distribution request sent by the first terminal in the embodiment of FIG. 3A and FIG. 3B. A difference lies in: Because in the embodiment of FIG. 3A and FIG. 3B, the first terminal sends the state query request first, and the state query request certainly carries the identifier of the first terminal, so that the wearable device may determine with which terminal the wearable device specifically communicates. Therefore, the distribution request subsequently sent by the first terminal may not carry the identifier of the first terminal. However, in this embodiment of this application, after being paired with the wearable device, the first terminal directly sends the distribution request. To ensure that the wearable device can determine a terminal that communicates with the wearable device, in this embodiment of this application, the distribution request certainly carries the identifier of the first terminal.

Same as the embodiment of FIG. 3A and FIG. 3B, this embodiment of this application is also applicable to the following two scenarios:

1. After the first terminal is successfully paired with the wearable device, the first terminal communicates with the wearable device, obtains identifiers of all function resources included in the wearable device, and displays all functions included in the wearable device, so that a user of the first terminal learns about the functions included in the wearable device.

In a scenario in which the user selects and triggers to request to use a first function, the first terminal sends the distribution request to the wearable device.

2. After the first terminal is successfully paired with the wearable device, in a scenario in which the user selects and triggers to request to use a first function, the first terminal sends the distribution request to the wearable device.

Specifically, in the first scenario, as shown in FIG. 14, the first terminal further performs S502 after S500 and before S501, and performs S506 after S501.

S502: The first terminal obtains identifiers of all function resources included in the wearable device, and displays functions indicated by the identifiers of all the function resources.

Because S502 is an optional step, S502 is represented by using a dashed line box in FIG. 14.

Specifically, in the second scenario, as shown in FIG. 14, after performing S501, the first terminal performs S503.

S503: The wearable device detects whether a function resource list includes the identifier of the first function resource.

S504: If the function resource list does not include the identifier of the first function resource, the wearable device sends a termination response to the first terminal.

S505: The first terminal terminates requesting the wearable device to distribute the first function resource to the first terminal.

S506: If the function resource list includes the identifier of the first function resource, the wearable device detects whether a function resource occupation list includes the identifier of the first function resource.

S502 to S506 are the same as S302 to S306, and details are not described herein again.

S507: If the function resource occupation list does not include the identifier of the first function resource, the wearable device determines that the first function resource is not occupied, and the wearable device displays an interaction interface, to remind a user whether to allow to distribute the first function resource to the first terminal.

In this embodiment of this application, when determining that the first function resource is not occupied, the wearable device may directly display the interaction interface, to remind the user whether to allow to distribute the first function resource to the first terminal, thereby enhancing interaction with the user, improving user experience, and improving security of the first function resource to some extent.

S508: If the wearable device allows to distribute the first function resource to the first terminal, the wearable device sends a notification message used to instruct the first terminal to use the first function resource to the first terminal.

S509: The first terminal uses the first function resource, implements a corresponding function, and displays a corresponding interface.

S508 and S509 are the same as S309 and S310, and details are not described herein again.

It should be noted that in the configuration method provided in this embodiment of this application, when determining that the first function resource is not occupied, the wearable device may directly send the notification message used to instruct the first terminal to use the first function resource to the first terminal, that is, S507 is an optional step.

Correspondingly, if the wearable device forbids to distribute the first function resource to the first terminal, the wearable device sends the termination response to the first terminal, that is, S504 is performed.

S510: If the function resource occupation list includes the identifier of the first function resource, the wearable device detects whether an identifier, of a terminal, that corresponds to the identifier of the first function resource in the function resource occupation list is the same as the identifier of the first terminal.

S511: If the identifier, of the terminal, that corresponds to the identifier of the first function resource in the function resource occupation list is the same as the identifier of the first terminal, the wearable device determines that a state of the first function resource is that the first function resource is already occupied by the first terminal, and sends the notification message used to instruct the first terminal to use the first function resource to the first terminal.

S512: If the identifier, of the terminal, that corresponds to the identifier of the first function resource in the function resource occupation list is an identifier of a second terminal, and the identifier of the second terminal is different from the identifier of the first terminal, the wearable device determines that the first function resource is already occupied by the second terminal.

Specifically, after the wearable device determines that the first function resource is already occupied by the second terminal, the wearable device displays the interaction interface, to remind the user whether to allow to distribute the first function resource to the first terminal. That is, in this embodiment of this application, after S512, S507 to S509 are further performed.

Further, in the configuration method provided in this embodiment of this application, when performing S508, the wearable device notifies the second terminal that the second terminal cannot continue to occupy the first function resource at this moment, and changes the identifier, of the terminal, that corresponds to the identifier of the first function resource in the function resource occupation list of the wearable device, that is, changes the identifier of the second terminal to the identifier of the first terminal, so as to ensure correctness of the correspondence stored in the function resource occupation list.

In addition, in a scenario in which the first terminal requests to distribute the first function resource to the first terminal, and the first function resource is already occupied by the second terminal, the wearable device may further determine, based on occupation duration, whether to allow the first terminal to use the first function resource; or determine, by comparing a priority of the first terminal with a priority of the second terminal, whether to allow the first terminal to use the first function resource. The determining, by the wearable device in the two manners, whether to allow the first terminal to use the first function resource is not shown in FIG. 14.

Further, in this embodiment of this application, when determining that the first terminal does not use the first function resource any more, the first terminal may send a connection termination message to the wearable device, to disconnect the wearable device from the first terminal, so that the first function resource in the wearable device is released. Correspondingly, the wearable device deletes the correspondence between the identifier of the first function resource and the identifier of the first terminal from the function resource occupation list of the wearable device.

In conclusion, the embodiment of FIG. 3A and FIG. 3B and the embodiment of FIG. 14 essentially describe communication between the first terminal and the wearable device. In the embodiment of FIG. 3A and FIG. 3B, the wearable device detects the state of the first function resource based on the state query request, and subsequently determines, based on the distribution request, whether to allow the first terminal to use the first function resource. In the embodiment of FIG. 14, the wearable device detects the state of the first function resource based on the distribution request, and determines, based on the distribution request, whether to allow the first terminal to use the first function resource. That is, the distribution request in the embodiment of FIG. 14 is essentially a message combining the state query request and the distribution request in the embodiment of FIG. 3A and FIG. 3B.

It should be noted that in this embodiment of this application, communication between the first terminal and the wearable device may alternatively be implemented by using another message, to achieve an objective that in a scenario in which the first function resource is already occupied by the second terminal, the first terminal may also use the first function resource.

For a more detailed process of the embodiment of FIG. 14, refer to the embodiment of FIG. 4A and FIG. 4B. A difference lies in that a function of the distribution request in the more detailed process of the embodiment of FIG. 14 is equivalent to functions of the state query request and the distribution request in the embodiment of FIG. 4A and FIG. 4B.

In this embodiment of this application, the wearable device includes at least one function resource. For the first function resource in the at least one function resource, even if the first function resource is already occupied by the second terminal, after receiving the distribution request sent by the first terminal, the wearable device also determines, based on the distribution request received by the wearable device, whether to allow the first terminal to use the first function resource. If the wearable device allows the first terminal to use the first function resource, the wearable device sends the notification message to the first terminal, to instruct the first terminal to use the first function resource. In this way, in a scenario in which the first function resource is already occupied by the second terminal, the first terminal may also use the first function resource.

An embodiment of this application provides a wearable device. The wearable device is configured to perform the steps performed by the wearable device in the foregoing function resource configuration methods. The wearable device provided in this embodiment of this application may include modules corresponding to corresponding steps.

In this embodiment of this application, functional modules of the wearable device may be divided based on the foregoing method examples. For example, functional modules may be divided based on functions, or two or more functions may be integrated into one processing module. The integrated module may be implemented in a form of hardware, or may be implemented in a form of a software functional module. In this embodiment of this application, the module division is an example, and is merely logical function division, and there may be other division manners in actual implementation.

Figure 15:
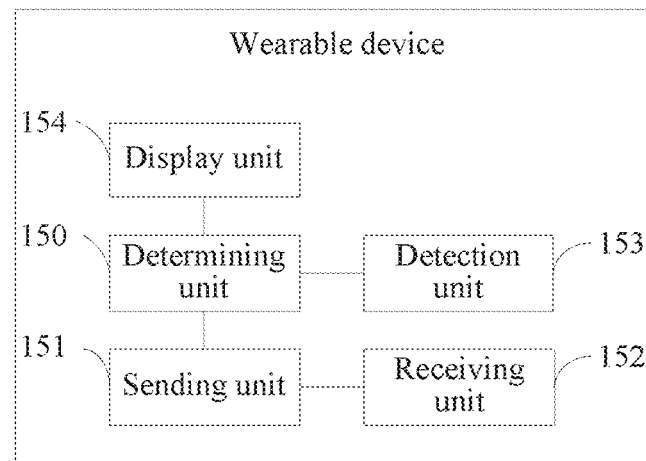
FIG. 15 is a first schematic structural diagram of a wearable device according to an embodiment of this application.

When the functional modules are divided based on the functions, FIG. 15 is a schematic diagram of a possible structure of the wearable device in the foregoing embodiments. As shown in FIG. 15, the wearable device includes a determining unit 150, a sending unit 151, a receiving unit 152, a detection unit 153, and a display unit 154. The determining unit 150 is configured to support the wearable device to perform S307, S313, and S314 in FIG. 3A and FIG. 3B; the sending unit 151 is configured to support the wearable device to perform S304, S307, S310, and S313 in FIG. 3A and FIG. 3B; the receiving unit 152 is configured to support the wearable device to perform S301 and S308 in FIG. 3A and FIG. 3B; the detection unit 153 is configured to support the wearable device to perform S303, S306, S309, and S312 in FIG. 3A and FIG. 3B; and the display unit 154 is configured to support the wearable device to perform S309 in FIG. 3A and FIG. 3B. For function descriptions of the corresponding functional modules, refer to all related content of the steps in the foregoing method embodiments, and details are not described herein again.

Figure 16:
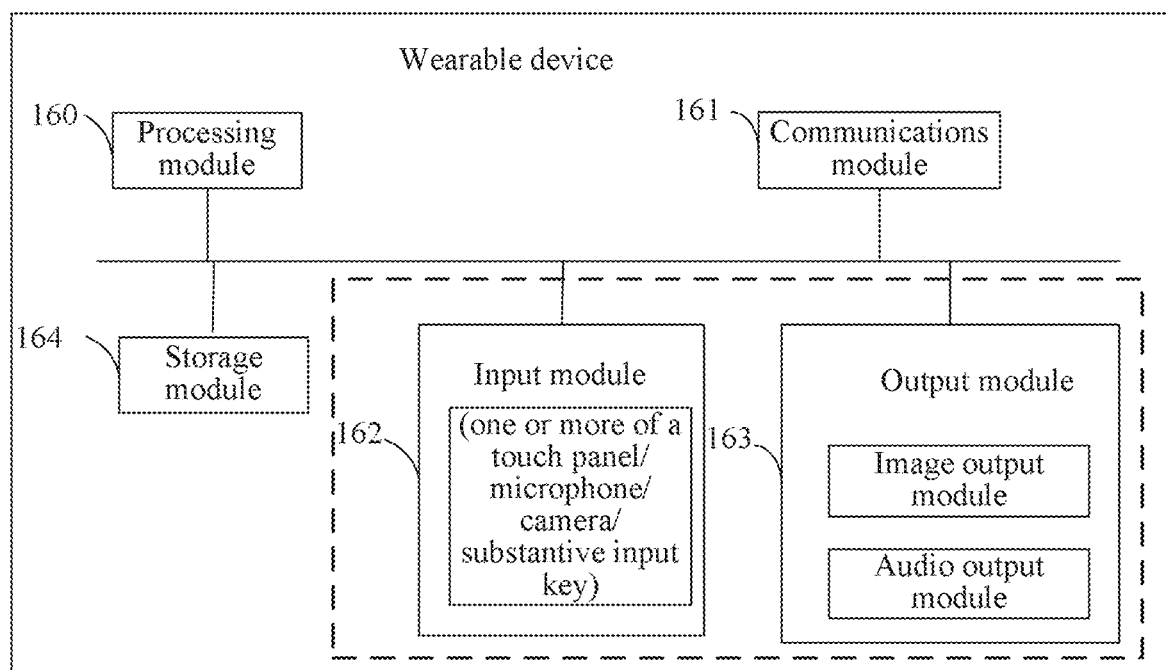
FIG. 16 is a second schematic structural diagram of a wearable device according to an embodiment of this application.

When an integrated unit is used, FIG. 16 is a schematic diagram of a possible structure of the wearable device in the foregoing embodiments. As shown in FIG. 16, the wearable device includes a processing module 160 and a communications module 161. The processing module 160 is configured to control and manage an action of the wearable device. For example, the processing module 160 is configured to support the wearable device to perform S307, S309, S313, and S314 in FIG. 3A and FIG. 3B, and/or applied to another process of the technology described in this specification. The communications module 161 is configured to support communication between the wearable device and a terminal. For example, the communications module 161 is configured to support the wearable device to perform S301, S303, S304, S306, S307, S308, S309, S310, S316, and S313 in FIG. 3A and FIG. 3B.

In this embodiment of this application, the processing module 160 may be a processor or a controller, for example, a CPU (Central Processing Unit, central processing unit) or a DSP (Digital Signal Processor, digital signal processor). The processing module 160 can implement or perform various examples of logical blocks, modules, and circuits described with reference to content disclosed in this application.

In this embodiment of this application, the communications module 161 may be a Bluetooth module configured to exchange data with an external device, and may further include an RF (Radio Frequency, radio frequency) circuit corresponding to the Bluetooth module. The RF radio frequency circuit is configured to receive and send a signal during an information receiving and sending process or during a call.

In this embodiment of this application, the communications module 161 may alternatively be a communications interface (English full name: Communication Interface) configured to exchange data with an external device. The communications module may include two communications interfaces: a sending interface configured to send data to the external device and a receiving interface configured to receive data from the external device, that is, the wearable device may separately implement receiving and sending of data by using two different communications interfaces. Certainly, the communications module 161 may integrate a data receiving function and a data sending function on one communications interface, so that the communications interface has the data receiving function and the data sending function. The communications interface may be integrated on a Bluetooth chip or an NFC chip.

In this embodiment of this application, the communications module 161 may alternatively be a transceiver, a transceiver circuit, or the like.

Optionally, the wearable device may further include some input modules 162. The input module 162 is configured to implement interaction between a user and the wearable device.

The input module 162 may receive digit or character information input by the user, to generate signal input related to a user setting or function control. In a specific implementation of this application, the input module 162 may be a touch panel, or may be another human-computer interaction interface such as a substantive input key or a microphone, or may be another external information capturing apparatus such as a camera.

In another implementation of this application, the substantive input key used by the input module 162 may include, but is not limited to, one or more of a physical keyboard, a functional key (such as a volume control key or an on/off key), a trackball, a mouse, or a joystick. The input module 162 in a form of a microphone may collect a voice input by the user or from an environment and convert the voice into a command that is in a form of an electrical signal and that can be executed by the processing module 160.

Optionally, the wearable device may further include some output modules 163. The output module 163 is configured to implement interaction between the user and the wearable device.

The output module 163 includes, but is not limited to, an image output module and an audio output module. The image output module is configured to output a text, a picture, and/or a video. The image output module may include a display panel, for example, a display panel configured in a form of an LCD (Liquid Crystal Display, liquid crystal display), an OLED (Organic Light-Emitting Diode, organic light-emitting diode), an FED (Field Emission Display, field emission display), or the like. The image output module may include a single display panel or a plurality of display panels of different sizes. In a specific implementation of this application, the touch panel used by the input module 162 may also be used as the display panel of the output module 163. For example, after detecting a touch on the touch panel or a gesture operation near the touch panel, the touch panel transfers the touch or the gesture operation to the processing module 160, so as to determine a type of a touch event. Then, the processing module 160 provides corresponding visual output on the display panel based on the type of the touch event.

As shown in FIG. 16, the input module 162 and the output module 163 may be used as two independent components to implement input and output functions of the wearable device. However, in some embodiments, the input module 162 and the output module 163 may be integrated to implement the input and output functions of the wearable device (as shown in FIG. 16, the input module 162 and the output module 163 are included in one dashed line box, to indicate that the input module 162 and the output module 163 are integrated).

Optionally, in this embodiment of this application, the wearable device further includes a storage module 164, configured to store a function resource list, and may be further configured to store a function resource occupation list, and may be further configured to store at least one function resource.

The storage module 164 may be a memory.

Figure 17:
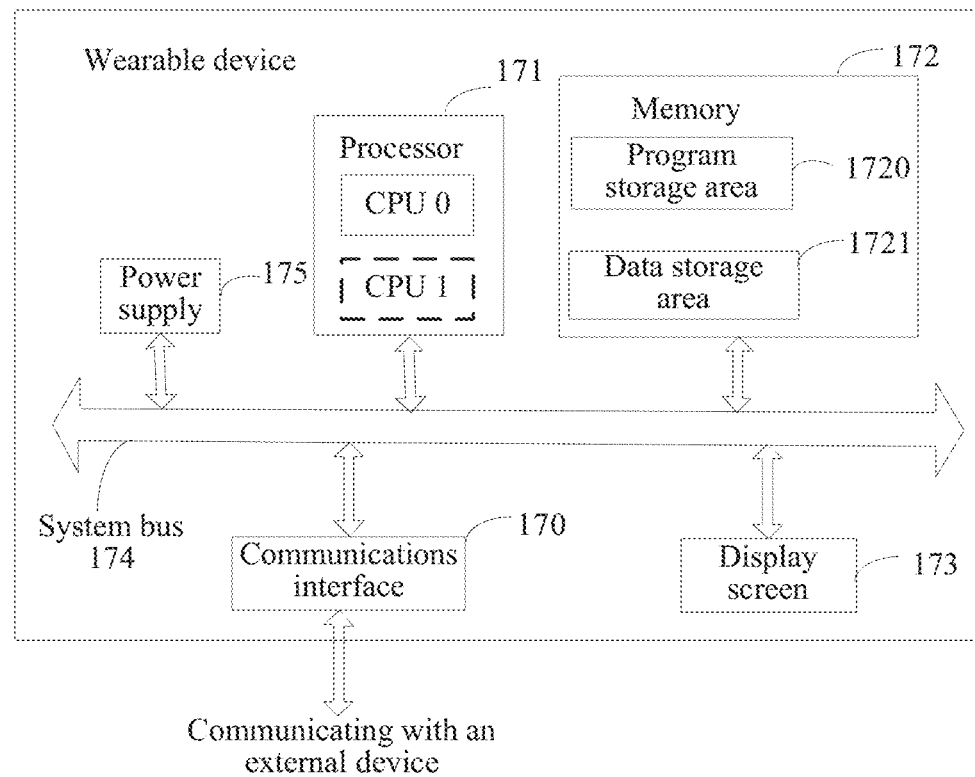
FIG. 17 is a third schematic structural diagram of a wearable device according to an embodiment of this application.

When the processing module 160 is a processor, the communications module 161 is a communications interface, the input module 162 and the output module 163 are a same display screen, and the storage module 164 is a memory, the wearable device in this embodiment of this application may be a wearable device shown in FIG. 17.

As shown in FIG. 17, the wearable device includes a communications interface 170, a processor 171, a memory 172, and a display screen 173. The communications interface 170, the processor 171, the memory 172, and the display screen 173 are connected and communicate with each other by using a system bus 174.

When the wearable device is running, the wearable device performs the function resource configuration method in the embodiment shown in FIG. 3A and FIG. 3B, FIG. 4A and FIG. 4B, or FIG. 14. For a specific function resource configuration method, refer to the foregoing related descriptions in the embodiment shown in FIG. 3A and FIG. 3B, FIG. 4A and FIG. 4B, or FIG. 14, and details are not described herein again.

The memory 172 may be configured to store a function resource list and a function resource occupation list, and may be further configured to store a software program and an application module. By running the software program and the application module that are stored in the memory 172, the processor 171 performs various functional applications and data processing of the wearable device.

The memory 172 may mainly include a program storage area 1720 and a data storage area 1721. The program storage area 1720 may store an operating system, and an application required by at least one function, for example, a program for detecting a state of a first function resource. The data storage area 1721 may store the function resource list, the function resource occupation list, and a function resource. In an implementation of this application, the operating system may be an Android (Android) system, an iOS system, or a Windows operating system, or may be an embedded operating system such as VxWorks.

In a specific implementation of this application, the memory 172 may include a volatile memory, such as an NVRAM (Nonvolatile Random Access Memory, nonvolatile dynamic random access memory), a PRAM (Phase Change RAM, phase change random access memory), or an MRAM (Magnetic Random Access Memory, magnetoresistive random access memory); or the memory 172 may include a nonvolatile memory, such as at least one magnetic disk storage device, an EEPROM (Electrically Erasable Programmable Read-Only Memory, electrically erasable programmable read-only memory), or a flash memory such as a NOR flash memory (NOR flash memory) or a NAND flash memory (NAND flash memory). The nonvolatile memory stores an operating system and an application that are executed by the processor 171. The processor 171 loads a running program and data from the nonvolatile memory to a memory and stores data content in a large quantity of storage apparatuses.

The memory 172 may independently exist, and is connected to the processor 171 by using the system bus 174. The memory 172 may alternatively be integrated with the processor 171.

The processor 171 is a control center of the wearable device. The processor 171 is connected to various parts of the entire wearable device by using various interfaces and lines. By running or executing the software program and/or the application module stored in the memory 172, and invoking data stored in the memory 172, the processor 171 performs various functions and data processing of the wearable device, thereby performing overall monitoring on the wearable device.

The processor 171 may include only the CPU, or may be a combination of the CPU, a GPU (Graphic Processing Unit, graphics processing unit), the DSP, and a control chip (such as a baseband chip) in a communications unit. In this implementation of this application, the CPU may include a single operation core, or may include a plurality of operation cores. In a specific implementation, in an embodiment, the processor 171 may include one or more CPUs. For example, the processor 171 in FIG. 17 includes a CPU 0 and a CPU 1.

The system bus 174 may be an ISA (Industry Standard Architecture, industry standard architecture) bus, a PCI (Peripheral Component Interconnect, peripheral component interconnect) bus, an EISA (Extended Industry Standard Architecture, extended industry standard architecture) bus, or the like. The system bus 174 may be classified into an address bus, a data bus, a control bus, and the like. In this embodiment of this application, for a purpose of clear description, all buses are marked as the system bus 174 in FIG. 17.

Further, the wearable device may further include a power supply 175, configured to supply power to different components of the wearable device to maintain running of the components. It is generally understood that the power supply 175 may be a built-in battery such as a common lithium-ion battery or a nickel-hydride battery; or may include an external power supply, such as an AC (Alternating Current, alternating current) adapter, that directly supplies power to the wearable device. In some implementations of this application, the power supply 175 may alternatively have a broader definition, for example, may also include a power management system, a charging system, a power fault detection circuit, a power converter or inverter, a power status indicator (such as a light emitting diode), and any other component related to power generation, management, and distribution of the wearable device.

It should be noted that the wearable device may further include a wearing apparatus for wearing the wearing device by a user. For example, a smartband includes a wrist strap.

Correspondingly, another embodiment of this application further provides a computer-readable storage medium. The computer-readable storage medium includes one or more pieces of program code. The one or more programs include an instruction. When a processor of a wearable device performs the program code, the wearable device performs the function resource configuration method shown in FIG. 3A and FIG. 3B, FIG. 4A and FIG. 4B, or FIG. 14.

In this embodiment of this application, the wearable device includes at least one function resource. For a first function resource in the at least one function resource, even if the first function resource is already occupied by a second terminal, after receiving a distribution request sent by a first terminal, the wearable device also determines, based on the distribution request received by the wearable device, whether to allow the first terminal to use the first function resource. If the wearable device allows the first terminal to use the first function resource, the wearable device sends a notification message to the first terminal, to instruct the first terminal to use the first function resource. In this way, in a scenario in which the first function resource is already occupied by the second terminal, the first terminal may also use the first function resource.

An embodiment of this application provides a terminal. The terminal is configured to perform the steps performed by the terminal in the foregoing function resource configuration method. The terminal provided in this embodiment of this application may include modules corresponding to corresponding steps.

In this embodiment of this application, functional modules of the terminal may be divided based on the foregoing method examples. For example, functional modules may be divided based on functions, or two or more functions may be integrated into one processing module. The integrated module may be implemented in a form of hardware, or may be implemented in a form of a software functional module. In this embodiment of this application, the module division is an example, and is merely logical function division, and there may be other division manners in actual implementation.

Figure 18:
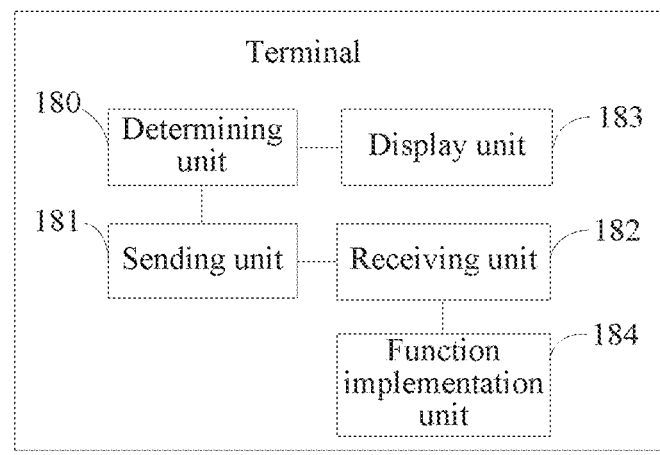
FIG. 18 is a first schematic structural diagram of a terminal according to an embodiment of this application.

When the functional modules are divided based on the functions, FIG. 18 is a schematic diagram of a possible structure of the terminal in the foregoing embodiments. As shown in FIG. 18, the terminal includes a determining unit 180, a sending unit 181, a receiving unit 182, a display unit 183, and a function implementation unit 184. The determining unit 180 is configured to support the terminal to perform S302 in FIG. 3A and FIG. 3B; the sending unit 181 is configured to support the terminal to perform S301 and S308 in FIG. 3A and FIG. 3B; the receiving unit 182 is configured to support the terminal to perform S304, S307, S310, and S313 in FIG. 3A and FIG. 3B; the display unit 183 is configured to support the terminal to perform S315 in FIG. 3A and FIG. 3B; and the function implementation unit 184 is configured to support the terminal to perform S311 in FIG. 3A and FIG. 3B. For function descriptions of the corresponding functional modules, refer to all related content of the steps in the foregoing method embodiments, and details are not described herein again.

Figure 19:
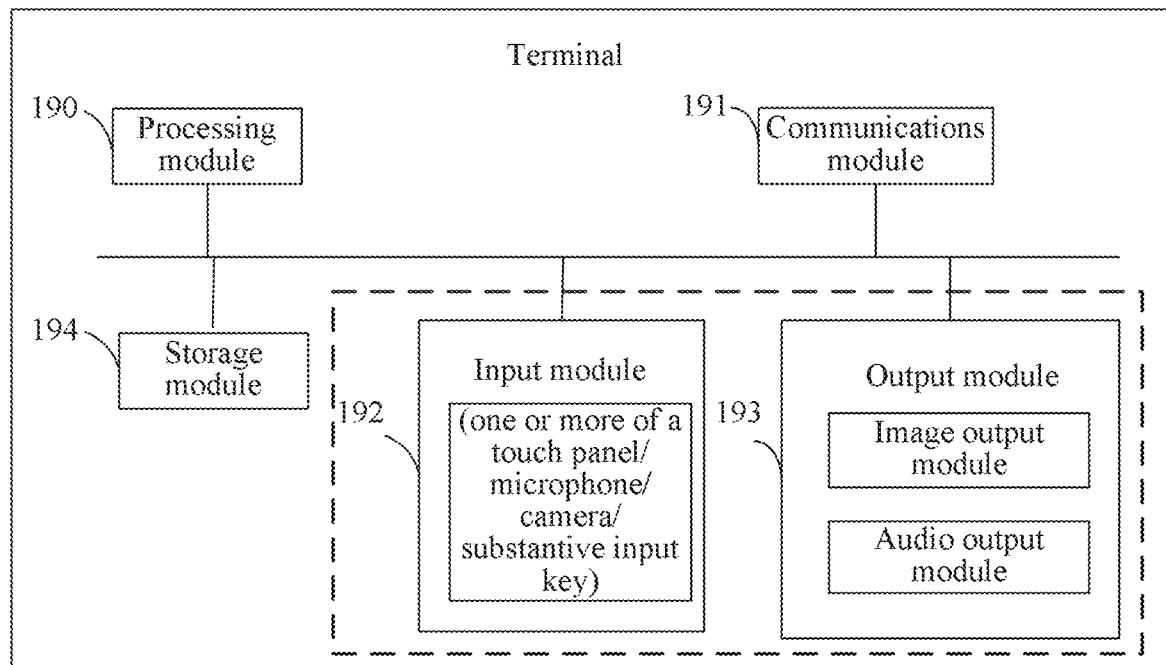
FIG. 19 is a second schematic structural diagram of a terminal according to an embodiment of this application.

When an integrated unit is used, FIG. 19 is a schematic diagram of a possible structure of the terminal in the foregoing embodiments. As shown in FIG. 19, the terminal includes a processing module 190 and a communications module 191. The processing module 190 is configured to control and manage an action of the terminal. For example, the processing module 190 is configured to support the terminal to perform S302, S311, and S315 in FIG. 3A and FIG. 3B, and/or applied to another process of the technology described in this specification. The communications module 191 is configured to support communication between the terminal and another terminal. For example, the communications module 191 is configured to support the terminal to perform S301, S304, S307, S308, S310, and S315 in FIG. 3A and FIG. 3B.

In this embodiment of this application, the processing module 190 may be a processor or a controller, for example, a CPU or a DSP. The processing module 190 can implement or perform various examples of logical blocks, modules, and circuits described with reference to content disclosed in this application.

In this embodiment of this application, the communications module 191 may be a Bluetooth module configured to exchange data with an external device, or may be a communications interface configured to exchange data with an external device, or may be a transceiver, a transceiver circuit, or the like.

Similar to the wearable device, in this embodiment of this application, the communications module 191 may also include two communications interfaces: a sending interface configured to send data to the external device and a receiving interface configured to receive data from the external device, that is, the terminal may separately implement receiving and sending of data by using two different communications interfaces. Certainly, the communications module 191 may integrate a data receiving function and a data sending function on one communications interface, so that the communications interface has the data receiving function and the data sending function. The communications interface may be integrated on a Bluetooth chip or an NFC chip.

Optionally, the terminal may further include some input modules 192 and output modules 193 that are configured to implement interaction between a user and the terminal. For structures of the input module 192 and the output module 193, refer to corresponding parts in FIG. 16, and details are not described herein again.

Optionally, in this embodiment of this application, the terminal further includes a storage module 194, configured to store an operating system and an application.

The storage module 194 may be a memory.

Figure 20:
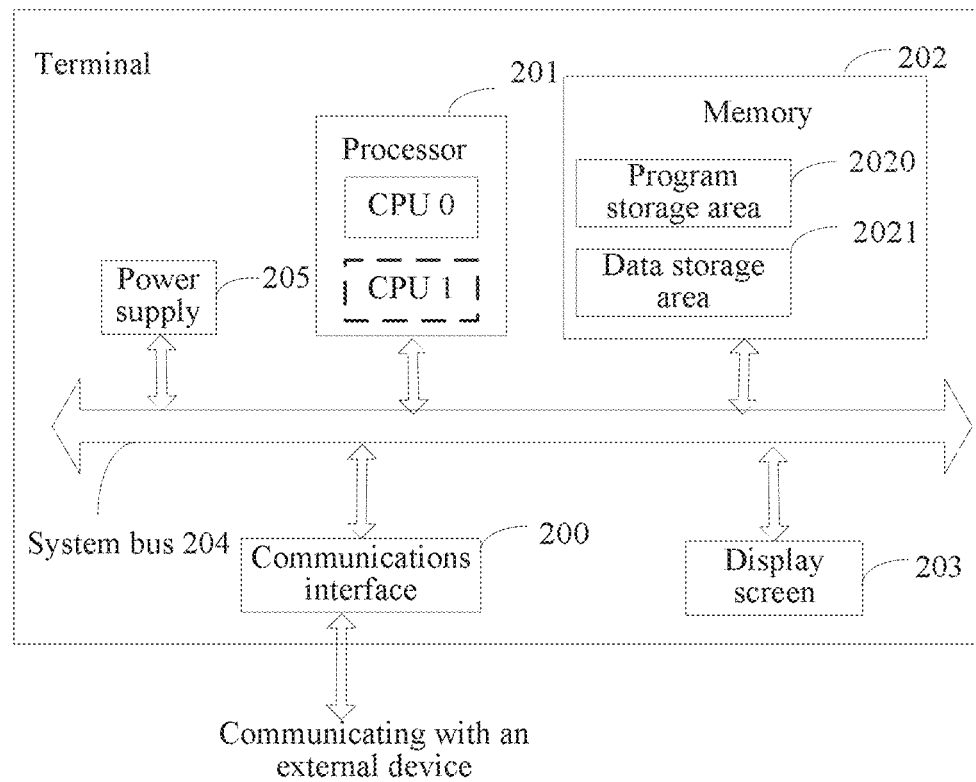
FIG. 20 is a third schematic structural diagram of a terminal according to an embodiment of this application.

When the processing module 190 is a processor, the communications module 191 is a communications interface, the input module 192 and the output module 193 are a same display screen, and the storage module 194 is a memory, the terminal in this embodiment of this application may be the terminal shown in FIG. 20.

As shown in FIG. 20, the terminal includes a communications interface 200, a processor 201, a memory 202, and a display screen 203. The communications interface 200, the processor 201, the memory 202, and the display screen 203 are connected and communicate with each other by using a system bus 204. For hardware structures of the communications interface 200, the processor 201, the memory 202, the display screen 203, the system bus 204, and a power supply 205, refer to corresponding parts in FIG. 17, and details are not described herein again.

When the terminal is running, the terminal performs the function resource configuration method in the embodiment shown in FIG. 3A and FIG. 3B, FIG. 4A and FIG. 4B, or FIG. 14. For a specific function resource configuration method, refer to the foregoing related descriptions in the embodiment shown in FIG. 3A and FIG. 3B, FIG. 4A and FIG. 4B, or FIG. 14, and details are not described herein again.

Correspondingly, another embodiment of this application further provides a computer-readable storage medium. The computer-readable storage medium includes one or more pieces of program code. The one or more programs include an instruction. When a processor of a terminal performs the program code, the terminal performs the function resource configuration method shown in FIG. 3A and FIG. 3B.

In this embodiment of this application, after determining that a first function resource is already occupied by another terminal, the terminal sends a distribution request to a wearable device, to request the wearable device to distribute a first function resource to the terminal. Correspondingly, the terminal may receive a notification message that is sent by the wearable device and that is used to indicate that the wearable device allows the terminal to use the first function resource. The terminal uses the first function resource based on the notification message received by the terminal. In this way, in a scenario in which the first function resource is already occupied by the another terminal, the terminal may also use the first function resource.

It may be clearly understood by a person skilled in the art that, for the purpose of convenient and brief description, division of the foregoing functional modules is merely used as an example for description. In an actual application, the foregoing functions may be distributed to different functional modules and implemented based on a requirement, that is, an inner structure of a mobile device is divided into different functional modules to implement all or some of the functions described above. For a detailed working process of the foregoing system, mobile device, and units, refer to a corresponding process in the foregoing method embodiments, and details are not described herein again.

In the several embodiments provided in this application, it should be understood that the disclosed system, mobile device, and method may be implemented in other manners. For example, the described mobile device embodiment is merely an example. For example, the module or unit division is merely logical function division and may be other divisions in actual implementations. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between mobile devices or units may be implemented in electrical, mechanical, or other forms.

The units described as separate parts may or may not be physically separated, and parts shown as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) or a processor (processor) to perform all or some of the steps of the methods described in the embodiments of this application. The storage medium includes: any medium that can store program code, such as a USB flash drive (Universal Serial Bus flash disk, Universal Serial Bus flash drive), a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A system, comprising:
a wearable device comprising a functional resource and configured to support a BLUETOOTH connection;
a first device configured to:
couple to the wearable device through the BLUETOOTH connection; and
use the functional resource; and
a second device configured to:
couple to the wearable device through the BLUETOOTH connection;
display a first interface indicating that the functional resource is occupied by the first device;
receive a user operation on a control in the first interface;
request, in response to the user operation, an allocation of the functional resource to the second device; and
display a second interface indicating that the functional resource is occupied by the second device.

2. The system of claim 1, wherein the second device is further configured to use the functional resource.

3. The system of claim 1, wherein the second device is configured to couple to the wearable device through the BLUETOOTH connection at a same time that the first device is coupled to the wearable device.

4. The system of claim 1, wherein the functional resource comprises a music play function resource, and wherein the music play function resource is configured to implement a function of playing music for a device.

5. The system of claim 1, wherein the functional resource comprises a BLUETOOTH earphone function.

6. The system of claim 5, wherein the BLUETOOTH earphone function is configured to implement a call function of a user.

7. The system of claim 1, wherein the functional resource comprises a resource without a user attribute.

8. The system of claim 1, wherein the first device is further configured to:
- stop occupying the functional resource after the second device requests the allocation of the functional resource to the second device; and
- display a third interface indicating that the second device has occupied the functional resource.

9. The system of claim 1, wherein the first device is further configured to display a third interface indicating that the first device has occupied the functional resource before the first device uses the functional resource.

10. A method implemented by a first device, comprising:
- coupling to a wearable device through a BLUETOOTH connection to use a functional resource;
- displaying a first interface indicating that the functional resource is occupied by a second device;
- receiving a user operation on a control in the first interface;
- requesting, in response to the user operation on the control in the first interface, an allocation of the functional resource to the first device; and
- displaying a second interface indicating that the functional resource is occupied by the first device.

11. The method of claim 10, further comprising using the functional resource.

12. The method of claim 10, further comprising coupling to the wearable device at a same time that the second device is coupled to the wearable device.

13. The method of claim 10, wherein the functional resource comprises a music play function resource, and wherein the music play function resource is configured to implement a function of playing music for a device.

14. The method of claim 10, wherein the functional resource comprises a BLUETOOTH earphone function, and wherein the BLUETOOTH earphone function is configured to implement a call function of a user.

15. The method of claim 10, wherein the functional resource comprises a resource without a user attribute.

16. A computer program product comprising computer-executable instructions stored on a non-transitory computer-readable medium that, when executed by a processor, cause a first device to:
- couple to a wearable device through a BLUETOOTH connection to use a functional resource;
- display a first interface indicating that the functional resource of the wearable device is occupied by a second device;
- receive a user operation on a control in the first interface;
- request, in response to the user operation on the control in the first interface, an allocation of the functional resource to the first device; and
- display a second interface indicating that the functional resource is occupied by the first device.

17. The computer program product of claim 16, wherein the instructions further cause the first device to use the functional resource.

18. The computer program product of claim 16, wherein the instructions further cause the first device to couple to the wearable device at a same time that the second device is coupled to the wearable device.

19. The computer program product of claim 16, wherein the functional resource comprises a music play function resource or a BLUETOOTH earphone function, wherein the music play function resource is configured to implement a function of playing music for a device, and wherein the BLUETOOTH earphone function is configured to implement a call function of a user.

20. The computer program product of claim 16, wherein the functional resource comprises a resource without a user attribute.

* * * * *